(12) United States Patent
Shriberg et al.

(10) Patent No.: US 12,505,854 B2
(45) Date of Patent: Dec. 23, 2025

(54) ACOUSTIC AND NATURAL LANGUAGE PROCESSING MODELS FOR SPEECH-BASED SCREENING AND MONITORING OF BEHAVIORAL HEALTH CONDITIONS

(71) Applicant: Ellipsis Health, Inc., San Francisco, CA (US)

(72) Inventors: Elizabeth E. Shriberg, Berkeley (CA); Amir Hossein Harati Nejad Torbati, Toronto (CA); Tomasz Rutowski, Gdansk (PL); Michael Aratow, Mountain View, CA (US); Mainul Islam, San Francisco, CA (US); Yang Lu, Waterloo (CA); Piotr Chlebek, Gdynia (PL); Melissa McCool, San Francisco, CA (US); David Lin, Foster City, CA (US)

(73) Assignee: Ellipsis Health, Inc., San Francisco, CA (US)

( * ) Notice: Subject to any disclaimer, the term of this patent is extended or adjusted under 35 U.S.C. 154(b) by 224 days.

(21) Appl. No.: 17/726,999

(22) Filed: Apr. 22, 2022

(65) Prior Publication Data

US 2022/0328064 A1 Oct. 13, 2022

Related U.S. Application Data

(63) Continuation of application No. PCT/US2020/057182, filed on Oct. 23, 2020.
(Continued)

(51) Int. Cl.
*G10L 25/63* (2013.01)
*G10L 15/26* (2006.01)
*G10L 25/30* (2013.01)

(52) U.S. Cl.
CPC .............. *G10L 25/63* (2013.01); *G10L 15/26* (2013.01); *G10L 25/30* (2013.01)

(58) Field of Classification Search
CPC ......... G10L 25/63; G10L 15/26; G10L 25/30; G10L 25/66; A61B 5/0077;
(Continued)

(56) References Cited

U.S. PATENT DOCUMENTS 11,854,538 B1 * 12/2023 Rozgic .................... G10L 25/63
2002/0171551 A1 * 11/2002 Eshelman .......... G08B 21/0423
340/573.1
(Continued)

FOREIGN PATENT DOCUMENTS

JP 2017532082 A 11/2017
WO WO-2018204935 A1 11/2018
(Continued)

OTHER PUBLICATIONS

H. Nishizaki, "Data augmentation and feature extraction using variational autoencoder for acoustic modeling," 2017 Asia-Pacific Signal and Information Processing Association Annual Summit and Conference (APSIPA ASC), Kuala Lumpur, Malaysia, 2017, pp. 1222-1227, doi: 10.1109/APSIPA.2017.8282225. } (Year: 2017).*
(Continued)

*Primary Examiner* — Athar N Pasha
(74) *Attorney, Agent, or Firm* — Norton Rose Fulbright US LLP

(57) ABSTRACT

The present disclosure provides acoustic and natural language processing (NLP) models for predicting whether a subject has a behavioral or mental health state of interest based at least in part on input speech from said subject.

17 Claims, 20 Drawing Sheets

Related U.S. Application Data

(60) Provisional application No. 63/027,238, filed on May 19, 2020, provisional application No. 63/027,240, filed on May 19, 2020, provisional application No. 63/021,625, filed on May 7, 2020, provisional application No. 63/021,617, filed on May 7, 2020, provisional application No. 62/926,245, filed on Oct. 25, 2019.

(58) Field of Classification Search
CPC ............ A61B 2562/0204; A61B 5/165; A61B 5/4803; A61B 5/7267
See application file for complete search history.

(56) References Cited

U.S. PATENT DOCUMENTS

| | | | | |
|---|---|---|---|---|
| 2004/0138882 | A1* | 7/2004 | Miyazawa | G10L 21/0208 704/E15.01 |
| 2005/0238161 | A1* | 10/2005 | Yacoub | H04M 3/5175 379/265.06 |
| 2007/0073539 | A1* | 3/2007 | Chengalvarayan | G10L 15/20 704/E15.039 |
| 2010/0204993 | A1* | 8/2010 | Vogt | G10L 17/06 704/250 |
| 2012/0265024 | A1 | 10/2012 | Shrivastav et al. | |
| 2013/0006630 | A1 | 1/2013 | Hayakawa et al. | |
| 2015/0127594 | A1 | 5/2015 | Parada San Martin et al. | |
| 2015/0318002 | A1* | 11/2015 | Karam | A61B 5/4803 704/231 |
| 2016/0196389 | A1* | 7/2016 | Moturu | G16H 50/20 705/2 |
| 2018/0358129 | A1* | 12/2018 | Gorzelniak | G16H 50/70 |
| 2019/0341152 | A1* | 11/2019 | Mellem | G16H 50/30 |
| 2021/0090733 | A1* | 3/2021 | Dibari | G16H 15/00 |
| 2021/0097629 | A1* | 4/2021 | Wright | H04L 67/306 |
| 2021/0345925 | A1* | 11/2021 | Davis | A61B 5/7435 |

FOREIGN PATENT DOCUMENTS

| | | |
|---|---|---|
| WO | WO-2019081915 A1 | 5/2019 |
| WO | WO-2019246239 A1 | 12/2019 |
| WO | WO-2021081418 A1 | 4/2021 |

OTHER PUBLICATIONS

Howard, Jeremy and Sebastian Ruder. Fine-tuned Language Models for Text Classification. ArXiv abs/1801.06146 (2018).

Morency et al. Tutorial on Multimodal Machine Learning. ACL 2017 tutorials. Retrieved on Dec. 22, 2020. Retrieved from URL: https://www.cs.cmu.edu/-morency/MMML-Tutorial-ACL2017.pdf.

PCT/US2020/057182 International Search Report and Written Opinion dated Mar. 10, 2021.

Ringeval, Fabien et al. AVEC 2019 Workshop and Challenge: State-of-Mind, Detecting Depression with AI, and Cross-Cultural Affect Recognition. Proceedings of the 9th International on Audio/Visual Emotion Challenge and Workshop (2019).

Vaswani, Ashish et al. Attention is all you need. Arxiv abs/1706.03762 (2017).

Japanese Patent Office, Notice of Rejection issued for Japanese Patent Application No. 2022-524161, dated Jul. 30, 2024, 12 pages with English language translation.

European Patent Office, Communication Pursuant to Article 94(3) EPC issued in European Patent Application No. 20879970.0, dated May 12, 2025, 7 pages.

Japanese Patent Office, Notice of Rejection issued for Japanese Patent Application No. 2022-524161, dated Apr. 15, 2025, 6 pages with English language translation.

Voleti, R. et al. "A Review of Language and Speech Features for Cognitive-Linguistic Assessment," Cornell University, arXiv, https://arxiv.org/abs/1906.01157v1, Jun. 2019, 13 pages.

* cited by examiner

FIG. 12

| PHQ\GAD | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| 0 | 1488 | 507 | — | — | — | — | — | — | 8 | 18 | 6 | 0 | 3 | 1 | 1 | 2 | 0 | 1 | 0 | 0 | 0 | 0 | 0 | 0 | 1 |
| 1 | — | — | — | — | — | — | — | 17 | 20 | 9 | 17 | 11 | 3 | 0 | 1 | 2 | 1 | 0 | 1 | 0 | 0 | 0 | 0 | 1 | 0 |
| 2 | — | 53 | 75 | 61 | 34 | 14 | 7 | 5 | 1 | 3 | 1 | 2 | 1 | 0 | 2 | 0 | 0 | 0 | 0 | 0 | 0 | 0 | 0 | 0 | 0 |
| 3 | 62 | 21 | — | — | — | — | 73 | 45 | 22 | 20 | 14 | 6 | 5 | 4 | 3 | 6 | 1 | 0 | 3 | 2 | 0 | 0 | 0 | 0 | 0 |
| 4 | 40 | 17 | — | — | — | — | 94 | 73 | 42 | 23 | 15 | 11 | 4 | 8 | 5 | 5 | 3 | 3 | 1 | 0 | 1 | 0 | 0 | 0 | 0 |
| 5 | 22 | 1 | — | — | — | — | — | 78 | 56 | 25 | 20 | 23 | 19 | 6 | 11 | 7 | 7 | 2 | 3 | 1 | 0 | 0 | 0 | 0 | 0 |
| 6 | 10 | 2 | — | — | 91 | — | 93 | 57 | 39 | 31 | 22 | 19 | 13 | 14 | 4 | 3 | 4 | 2 | 2 | 1 | 0 | 0 | 0 | 0 | 1 |
| 7 | 8 | 3 | — | 54 | 71 | — | — | 56 | 51 | 49 | 36 | 31 | 19 | 22 | 17 | 14 | 13 | 13 | 11 | 6 | 6 | 4 | 3 | 2 | 2 |
| 8 | 2 | 2 | — | 26 | 41 | 58 | 71 | 87 | — | 58 | 47 | 36 | 41 | 22 | 17 | 17 | 14 | 10 | 10 | 5 | 4 | 3 | 2 | 1 | 0 |
| 9 | 1 | 1 | 18 | 9 | 31 | 27 | 38 | 52 | 64 | 71 | 65 | 58 | 49 | 36 | 34 | 31 | 28 | 24 | 20 | 19 | 17 | 13 | 8 | 2 | 0 |
| 10 | 0 | 2 | 6 | 17 | 17 | 31 | 34 | 45 | 39 | 53 | 55 | 59 | 47 | 39 | 38 | 31 | 24 | 16 | 18 | 18 | 19 | 6 | 5 | 2 | 3 |
| 11 | 0 | 0 | — | 11 | 6 | 15 | 22 | 29 | 44 | 54 | 36 | 36 | 39 | 39 | 36 | 23 | 18 | 18 | 13 | 9 | 3 | 9 | 3 | 1 | 2 |
| 12 | 0 | 1 | 3 | 3 | 6 | 11 | 26 | 21 | 34 | 36 | 35 | 36 | 33 | 35 | 28 | 39 | 24 | 26 | 28 | 20 | 10 | 14 | 9 | 3 | 6 |
| 13 | 0 | 0 | 1 | 0 | 9 | 5 | 13 | 14 | 20 | 29 | 24 | 31 | 28 | 28 | 29 | 21 | 26 | 29 | 19 | 11 | 10 | 11 | 7 | 3 | 6 |
| 14 | 0 | 0 | 1 | 0 | 3 | 1 | 10 | 11 | 8 | 12 | 17 | 24 | 32 | 29 | 29 | 31 | 33 | 25 | 29 | 23 | 17 | 13 | 4 | 5 | 1 |
| 15 | 0 | 0 | 2 | 2 | 3 | 4 | 7 | 5 | 7 | 16 | 10 | 16 | 27 | 19 | 27 | 20 | 33 | 20 | 23 | 19 | 26 | 9 | 1 | 6 | 2 |
| 16 | 0 | 0 | 1 | 4 | 3 | 3 | 7 | 8 | 10 | 8 | 11 | 10 | 13 | 31 | 18 | 36 | 28 | 22 | 32 | 18 | 14 | 6 | 11 | 3 | 6 |
| 17 | 0 | 1 | 0 | 0 | 1 | 3 | 5 | 3 | 4 | 8 | 13 | 9 | 20 | 16 | 17 | 19 | 23 | 30 | 31 | 24 | 14 | 10 | 9 | 3 | 9 |
| 18 | 0 | 0 | 1 | 0 | 0 | 2 | 3 | 4 | 5 | 5 | 9 | 4 | 11 | 17 | 10 | 16 | 17 | 23 | 20 | 20 | 21 | 14 | 11 | 8 | 11 |
| 19 | 0 | 0 | 0 | 1 | 1 | 1 | 0 | 3 | 2 | 3 | 2 | 3 | 14 | 13 | 8 | 11 | 16 | 17 | 21 | 28 | 18 | 10 | 11 | 12 | 30 |
| 20 | 0 | 0 | 0 | 1 | 0 | 1 | 3 | 2 | 4 | 2 | 4 | 5 | 7 | 6 | 5 | 5 | 9 | 17 | 21 | 28 | 24 | 16 | 19 | 14 | 16 |
| 21 | 0 | 0 | 0 | 0 | 1 | 4 | 0 | 3 | 1 | 1 | 1 | 3 | 5 | 2 | 10 | 7 | 10 | 15 | 17 | 23 | 14 | 24 | 19 | 26 | 19 |

FIG. 12

ACOUSTIC AND NATURAL LANGUAGE PROCESSING MODELS FOR SPEECH-BASED SCREENING AND MONITORING OF BEHAVIORAL HEALTH CONDITIONS

CROSS-REFERENCE

This application is a continuation of International Patent Application PCT/US2020/057182, filed Oct. 23, 2020, which claims priority to U.S. Provisional Patent Application No. 62/926,245, filed on Oct. 25, 2019, U.S. Provisional Patent Application No. 63/021,617, filed on May 7, 2020, U.S. Provisional Patent Application No. 63/021,625, filed on May 7, 2020, U.S. Provisional Patent Application No. 63/027,238, filed on May 19, 2020, and U.S. Provisional Patent Application No. 63/027,240, filed on May 19, 2020, each of which is incorporated herein by reference in its entirety.

BACKGROUND

Behavioral and mental health conditions are prevalent in the population, and they may have a significant cost to society. Therapies are available for such conditions, but many people may be undiagnosed.

SUMMARY

The present disclosure provides improved acoustic models for use in predicting whether a subject has a behavioral or mental health state of interest. The present disclosure also provides methods for training such models. The acoustic models described herein may have an automatic speech recognition ("ASR") system. The ASR system may have an encoder and a decoder. The encoder and decoder may be trained on transcribed speech data that is unrelated to behavioral or mental health. The acoustic models may also have a classifier. After the ASR system is trained, the decoder can be discarded, and the classifier can be trained on speech data that is labeled as originating or not originating from a subject determined to have the behavioral or mental health state of interest. The encoder can be trained along with the classifier, or it can be frozen. This training scheme may reduce the amount of behavioral or mental health-related training data required to train an acoustic model of this type. Additionally, the end-to-end acoustic model described herein can more accurately predict whether a subject has a behavioral or mental health state of interest than existing acoustic models. In particular, in predicting whether a patient has depression, the end-to-end acoustic model described herein has been demonstrated to have an area-under-the-curve ("AUC") of 0.75-0.79, a specificity of 0.68, and a sensitivity of 0.68. Existing i-vector and convolutional neural network ("CNN") models have AUCs, specificities, and sensitivities of only 0.60, 0.58, and 0.58 and 0.64, 0.60, and 0.60, respectively.

In addition to the encoder and classifier, the acoustic model also include a segment fusion model. The acoustic system may process a single audio segment at a time. Segment fusion may output a session-level acoustic model score by combining information from the segment-level outputs. The acoustic system may compute the mean of all predictions for each segment generated by classifier. More complex versions may use some representation of segments generated by the classifier module, and then employ other machine learning methods to compute the final prediction from these inputs. These methods may include LSTM, RCNN, multi-layer perceptron ("MLP"), random forest, and other models. The more complex method of combination over a simple averaging may yield large gains (for example, AUC of 0.79 versus 0.75). Using a more complex method may not change the modeling of the underlying segments—the gain may be obtained purely through the better fusion of the segment outputs.

The present disclosure also provides systems and methods for predicting, using natural language processing ("NLP") models, whether a subject has a behavioral or mental health condition. The NLP models described herein may have an encoder, a language model, and one or more classifiers. The encoder can receive a transcribed speech sample from a subject and generate an encoded speech sample (e.g., a real-valued vector). The language model and the classifier can process the encoded speech sample to generate a prediction that indicates whether the subject has the behavioral or mental health condition. The language model may first be trained on encoded-based representations that are not necessarily related to the behavioral or mental health condition. For example, the language model may be trained on a corpus of Wikipedia articles. The language model may then be fine-tuned on encoded text related to the behavioral or mental health condition. Thereafter, the one or more classifiers may be trained to predict whether the subject has the behavioral or mental health condition. The training data for the classifier may include a plurality of transcribed and encoded speech samples from a plurality of subjects. Each speech sample may be associated with a label that indicates whether the subject that provided the speech sample has the behavioral or mental health condition.

The training process described above may provide several improvements to the technical field of automated mental health detection. The use of generic and domain-specific text corpora to pretrain and finetune the language model may reduce the number labeled speech samples required to train the end-to-end NLP. Additionally, the pretrained and fine-tuned language model may be used in different end-to-end NLP models that detect different behavioral or mental health conditions. Reuse of such a language model for multiple tasks may further reduce training time.

The acoustic and NLPs models described above may be fused together to generate and even more robust composite model.

In one aspect, the present disclosure provides a method for detecting a behavioral or mental health condition in a subject with an acoustic model comprising an encoder and a classifier, the method comprising: (a) obtaining a speech sample comprising a plurality of speech segments from the subject; (b) processing the speech sample with the encoder to generate an abstract feature representation of the speech sample, wherein the encoder was pretrained to perform a first task other than detecting the behavioral or mental health condition in the subject; and (c) processing the abstract feature representation with the classifier to generate an output indicative of whether the subject has the behavioral or mental health condition, wherein the classifier has been trained on a training dataset comprising a plurality of speech samples from a plurality of speakers, and wherein a speech sample of the plurality of speech samples is labeled as originating or not originating from a speaker that has the behavioral or mental health state condition. In some embodiments, the method further comprises, prior to (b), converting the speech sample to filter banks or mel-frequency cepstrum coefficients. In some embodiments, the classifier is a binary classifier, and wherein the output is a binary output that indicates whether the subject has or does not have the behavioral or mental health condition. In some embodiments, the classifier is a multi-class classifier, and wherein the output comprises a probability distribution over a plurality of levels or severities of the behavioral or mental health condition in the subject. In some embodiments, the output comprises a segment output for each segment of the plurality of segments of the speech sample from the subject, and wherein the method further comprises fusing the segment outputs to detect the behavioral or mental health condition in the subject. In some embodiments, the first task is automatic speech recognition, speaker recognition, emotion classification, or sound classification. In some embodiments, (a) comprises obtaining the speech sample during a telehealth session. In some embodiments, (a) comprises obtaining the speech sample from a mobile device of the subject, and wherein (b) and (c) are performed at least in part on the mobile device. In some embodiments, (b) and (c) are performed at least in part on a remote server. In some embodiments, the method further comprises processing the speech sample with a non-speech model comprising a laugher model, a breathing model, or a pause model. In some embodiments, the method further comprises, prior to (b), determining whether the speech sample meets a quality threshold.

In another aspect, the present disclosure provides a method for training an acoustic model to detect a behavioral or mental health condition in a subject, where the acoustic model comprises an encoder and a classifier, the method comprising: (a) training, on a first training dataset, the encoder to perform a first task other than detecting the behavioral or mental health condition in the subject; (b) subsequent to (a), training, on a second training dataset that is different than the first training dataset, the encoder and the classifier to generate an output that is indicative of whether the subject has the behavioral or mental health state of interest, wherein the second training dataset comprises a plurality of speech samples from a plurality of speakers, and wherein a speech sample of the plurality of speech samples is labeled as originating or not originating from a speaker with the behavioral or mental health state of interest. In some embodiments, the first task is automatic speech recognition, speaker recognition, emotion classification, or sound classification. In some embodiments, (b) comprises training the classifier to process an abstract feature representation of the speech sample from the encoder to generate the output. In some embodiments, during (b), the encoder is fixed. In some embodiments, during (b), the encoder is not fixed. In some embodiments, (a) and (b) are supervised learning processes. In some embodiments, the classifier is a binary classifier, and wherein the output is a binary output that indicates whether the subject has or does not have the behavioral or mental health condition. In some embodiments, the classifier is a multi-class classifier, and wherein the output comprises a probability distribution over a plurality of levels or severities of the behavioral or mental health condition in the subject. In some embodiments, the output comprises a segment output for each segment of a plurality of segments of the speech sample from the subject, and wherein the method further comprises fusing the segment outputs to detect the behavioral or mental health condition in the subject.

In another aspect, the present disclosure provides a method for training an acoustic model to detect a behavioral or mental health condition in a subject, comprising: (a) training, on a first training dataset, an automatic speech recognition (ASR) system to transcribe speech samples, wherein the ASR system comprises an encoder and a decoder; (b) discarding the decoder; and (c) training, on a second training dataset that is different than the first training dataset, the encoder and a classifier to process a speech sample from the subject to generate an output indicative of whether the subject has the behavioral or mental health condition, wherein the second training dataset comprises a plurality of labeled speech samples that are labeled as originating or not originating from speakers who have the behavioral or mental health condition. In some embodiments, the method further comprises, prior to (a), converting the plurality of unlabeled speech samples to filter banks or mel-frequency cepstrum coefficients. In some embodiments, the method further comprises, prior to (c), converting the plurality of labeled speech samples to filter banks or mel-frequency cepstrum coefficients. In some embodiments, (a) comprises training the encoder to generate abstract feature representations of the speech samples and training the decoder to process the abstract feature representations of the speech samples to generate transcribed speech samples. In some embodiments, (c) comprises training the classifier to process an abstract feature representation of the speech sample from the encoder to generate the output. In some embodiments, during (c), the encoder is fixed. In some embodiments, during (c), the encoder is not fixed. In some embodiments, (a) and (c) are supervised learning processes. In some embodiments, the method further comprises training the classifier on a third training dataset comprising a plurality of labeled speech samples and metadata about a plurality of speakers that generated the plurality of labeled speech samples. In some embodiments, the metadata comprises one or more of an age, race, ethnicity, sex, gender, income, education, location, or medical history of each of the plurality of speakers. In some embodiments, the encoder comprises a convolutional neural network (CNN) and a long short-term memory network (LSTM). In some embodiments, the CNN is a Visual Geometry Group (VGG) network. In some embodiments, the classifier comprises a model selected from the group consisting of a recurrent convolutional neural network (RCNN), an LSTM with attention, a self-attention network, and a transformer. In some embodiments, the classifier is a binary classifier, and wherein the output is a binary output that indicates whether the subject has or does not have the behavioral or mental health condition. In some embodiments, the classifier is a multi-class classifier, and wherein the output comprises a probability distribution over a plurality of levels or severities of the behavioral or mental health condition in the subject. In some embodiments, the output comprises a segment output for each segment of a plurality of segments of the speech sample from the subject, and wherein the method further comprises fusing the segment outputs to detect the behavioral or mental health condition in the subject.

In another aspect, the present disclosure provides a method for detecting a behavioral or mental health condition in a subject using a natural language processing (NLP) model, wherein the NLP model comprises a language model and one or more classifiers, the method comprising: (a) obtaining a speech sample comprising a plurality of speech segments from the subject; (b) processing the speech sample or a derivative thereof with the language model to generate a language model output, wherein the language model has been trained on a first dataset and a second dataset, wherein the first dataset comprises text that is unrelated to the behavioral or mental health condition, wherein the second dataset comprises text that is related to the behavioral or mental health condition, and wherein the first dataset is substantially larger than the second dataset; and (c) processing the language model output with the one or more classifiers to generate an output that is indicative of whether the subject has the behavioral or mental health condition. In some embodiments, the method further comprises, prior to (b), transcribing the speech sample to generate a transcribed speech sample and generating embeddings of the transcribed speech sample using an encoder. In some embodiments, the language model comprises a long short-term memory (LSTM) network or a transformer. In some embodiments, the one or more classifiers comprises a binary classifier, and wherein (c) comprises generating a binary classification that indicates whether the subject has the behavioral or mental health condition or does not have the behavioral or mental health condition. In some embodiments, the one or more classifiers comprises a regression classifier, and wherein (c) comprises generating a probability distribution over a plurality of levels or severities of the behavioral or mental health condition of the subject. In some embodiments, the method further comprises fusing the binary classification and the probability distribution to generate the output. In some embodiments, the first dataset comprises a publicly available text corpus.

In another aspect, the present disclosure provides a method for training a natural language processing model to detect a behavioral or mental health condition, wherein the natural language processing model comprises (i) a language model and (ii) a classifier, and wherein the method comprises: (a) training the language model on first encoded text, wherein the first encoded text comprises text that is unrelated to the behavioral or mental health condition; (b) fine-tuning the language model on second encoded text and optionally on metadata information, wherein the second encoded text comprises text that is related to the behavioral or mental health condition; and (c) training the classifier to detect the behavioral or mental condition on a plurality of encoded speech samples from a plurality of subjects, wherein an encoded speech sample of the plurality of encoded speech samples is associated with a label and optional metadata information that indicates whether a subject that provided the encoded speech sample has the behavioral or mental health condition. In some embodiments, the language model comprises a long short-term memory (LSTM) network. In some embodiments, the training in (a) comprises a non-monotonical stochastic gradient descent process. In some embodiments, the training in (a) comprises a dropout or DropConnect operation. In some embodiments, the language model comprises a transformer. In some embodiments, the second encoded text comprises text that is related to an additional behavioral or mental health condition, and wherein the fine-tuning in (b) comprises multi-task learning. In some embodiments, the method further comprises training an additional classifier to detect the additional behavioral or mental condition on the plurality of encoded speech samples from the plurality of subjects, wherein an encoded speech sample of the plurality of encoded speech samples is associated with a label that indicates whether a subject that provided the encoded speech sample has the additional behavioral or mental health condition. In some embodiments, the behavioral or mental health condition is anxiety and wherein the additional behavioral or mental health condition is depression. In some embodiments, the fine-tuning in (b) comprises discriminative fine-tuning of different layers in the language model. In some embodiments, the fine-tuning in (b) comprises using a slanted triangular learning rate to train a layer of the language model. In some embodiments, the classifier comprises a binary classifier and a regression classifier, and wherein the training in (c) comprises (i) training the binary classifier to predict whether a test subject has or does not have the behavioral or mental health condition and (ii) training the regression classifier to predict a numerical score indicative of a severity of the behavioral or mental health condition in the subject. In some embodiments, an output of the natural language processing model is based at least in part on an output of the binary classifier and an output of the regression classifier. In some embodiments, the method further comprises, subsequent to (c): (d) obtaining a speech sample from a test subject; and (e) using the natural language processing model to process the speech sample to predict whether the test subject has the behavioral or mental health condition. In some embodiments, the speech sample comprises a plurality of responses to a plurality of queries, wherein (e) comprises using the natural language processing model to process the speech sample a plurality of times, and wherein the plurality of responses is arranged in a different order each time of the plurality of times. In some embodiments, the natural language processing model comprises an automatic speech recognition model for transcribing the plurality of speech samples from the plurality of subjects. In some embodiments, the natural language processing model comprises an encoder for encoding the plurality of transcribed speech samples. In some embodiments, the encoder is selected from the group consisting of an n-gram model, a skip-gram model, a neural network, and a byte-pair encoder. In some embodiments, the label is a result of standardized mental health questionnaire.

In another aspect, the present disclosure provides a method for determining whether a subject has or is likely to have a behavioral or mental health condition, comprising: (a) obtaining speech data from the subject; (b) computer processing the speech data to identify at least one language feature and at least one acoustic feature in the speech data; (c) computer processing the at least one language feature and the at least one acoustic feature to generate one or more scores, and using the one or more scores to generate a determination of whether the subject has or is likely to have the behavioral or mental health condition; and (d) outputting an electronic report comprising an indication of the determination generated in (c), wherein (b)-(d) are performed in less than 5 minutes, and wherein the determination generated in (c) has an area-under-the-curve (AUC) of at least about 0.70. In some embodiments, the AUC is at least about 0.75. In some embodiments, the AUC is at least about 0.80. In some embodiments, the electronic report comprises psychoeducation materials relating to the behavioral or mental health condition if the determination indicates that the subject has or is likely to have the behavioral or mental health condition.

In another aspect, the present disclosure provides a method for determining that a subject has or is likely to have a behavioral or mental health condition, comprising: (a) obtaining speech data from the subject; (b) computer processing the speech data to identify at least one speech feature and at least one acoustic feature in the speech data; (c) computer processing the at least one speech feature and the at least one acoustic feature to provide a determination that the subject has or is likely to have the behavioral or mental health condition; and (d) outputting an electronic report indicative of the determination provided in (c), wherein the computer processing in (b) or (c) optimizes at least one performance metric comprising a sensitivity or a specificity of the determination provided in (c).

In another aspect, the present disclosure provides a method for determining whether a subject has or is likely to have a behavioral or mental health condition, comprising: (a) during a telemedicine session on telemedicine application between the subject and a health care provider, obtaining an audio stream and a video stream of the subject; (b) obtaining one or more models comprising an acoustic model, a natural language processing model (NLP), and a video model, which one or more models are trained to determine whether the subject has or is likely to have the behavioral or mental health condition; (c) processing the audio stream or the video stream with the one or more models to generate a determination that is indicates whether the subject has or is likely to have the behavioral or mental health condition; and (d) while the telemedicine session is ongoing, transmitting the determination to a user interface of the health application running on a user device of the health care provider. In some embodiments, the method further comprises, using the natural language processing model to determine one or more topics or words in the audio stream and transmitting the one or more topics or words to the user interface. In some embodiments, the determination comprises a confidence interval of the determination. In some embodiments, the method further comprises repeating (a)-(d) continually during the telemedicine session. In some embodiments, (b) comprises selecting the one or more models based at least in part on demographic or medical history information about the subject.

Another aspect of the present disclosure provides a non-transitory computer readable medium comprising machine executable code that, upon execution by one or more computer processors, implements the systems described above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

In another aspect, the present disclosure provides a system comprising: one or more computer processors; and memory comprising machine-executable instructions that, upon execution by the one or more computer processors, cause the one or more computer processors to implement an acoustic model configured to predict whether a subject has a behavioral or mental health state of interest based at least in part on input speech comprising a plurality of segments from the subject, which acoustic model comprises: an encoder configured to generate abstract representations of the input speech, wherein the encoder is pretrained, using a transfer learning framework, to perform a task other than predicting whether the subject has the behavioral or mental health state of interest; at least one classifier configured to process the abstract representations of the input speech to generate an output that is indicative of whether the subject has the behavioral or mental health state of interest, wherein the at least one classifier has been trained on speech samples labeled as originating or not originating from a speaker with the behavioral or mental health state of interest. In some embodiments, the encoder comprises a Visual Geometry Group ("VGG") network and a stack of long short-term memory ("LSTM") networks. In some embodiments, the at least one classifier comprises a model selected from the group consisting of a recurrent convolutional neural network ("RCNN"), an LSTM with attention, a self-attention network, or a transformer. In some embodiments, the at least one classifier is further configured to process metadata about the subject to generate the output. In some embodiments, the metadata comprises an age or sex of the subject. In some embodiments, the encoder was trained on the transcribed speech samples with a decoder, and wherein the decoder is not a part of the system. In some embodiments, the task is automatic speech recognition, speaker recognition, emotion classification, or sound classification. In some embodiments, the segment outputs are averaged. In some embodiments, the segment outputs are fused using a machine learning algorithm. In some embodiments, the encoder is pretrained with a decoder, and wherein the encoder and decoder comprise an automatic speech recognition (ASR) system. In some embodiments, the decoder comprises one or more of an attention unit, a long short-term memory network, and a beam search unit. In some embodiments, the at least one classifier comprises a binary classifier. In some embodiments, the at least one classifier comprises a multi-class classifier, and wherein the output comprises a probability distribution over a plurality of seventies of the behavioral or mental health state of interest in the subject. In some embodiments, the output is a segment output for each segment of the plurality of segments of the input speech, and wherein the system further comprises a segment fusion module configured to fuse a learned representation of the segment outputs of the at least one classifier to obtain a predicted mental state.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 12 is a matrix of the scores from FIG. 11;

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Acoustic Models

Figure 1:
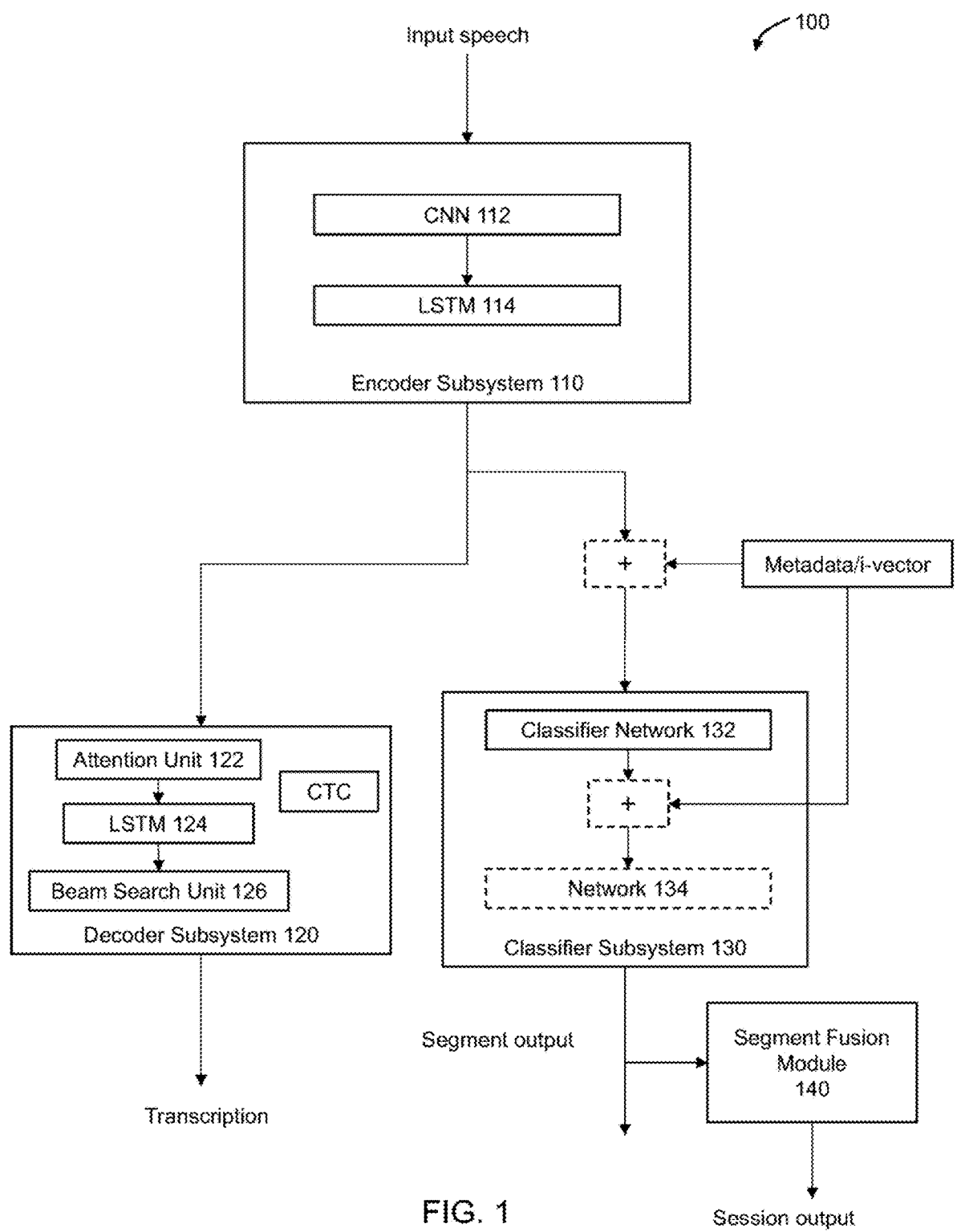
FIG. 1 schematically illustrates a system that is configured to predict whether a subject has a behavioral or mental health state of interest based at least in part on input speech from the subject.

FIG. 1 schematically illustrates a system 100 that is configured to predict whether a subject has a behavioral or mental health state of interest based at least in part on input speech from the subject. The behavioral or mental health state may be fatigue, loneliness, low motivation, stress, depression, anxiety, drug or alcohol addiction, post-traumatic stress disorder ("PTSD"), schizophrenia, bipolar disorder, dementia, suicidality, or the like. The behavioral or mental health state may be associated or comorbid with or defined in the Diagnostic and Statistical Manual of Mental Disorders.

The system 100 can obtain the input speech through a microphone or array of microphones that are on an Internet-connected device or connected to an Internet-connected device (e.g., via a Bluetooth connection). The device may be a wearable device (e.g., a smart watch), a mobile phone, a tablet, a laptop computer, a desktop computer, smart speakers, a home assistance device (e.g., an Amazon Alexa® device or a Google Home® device), or the like. The device may have a mental health application. The mental health application may visually or audibly prompt the subject to answer questions about the subject's work and home life, sleep, mood, medical history, and the like. The subject's answers to the prompts may be used as the input speech. The system 100 may be implemented on the mobile application, and it may process the input speech locally on the subject's mobile device. Alternatively or additionally, the mobile device can transmit the speech to a remote location for processing. In some cases, the processing may be performed partially on the local device and partially on a remote server.

Alternatively or additionally, the input speech may be obtained via a clinical encounter with a health care professional. For example, an audio recording device may capture speech from the subject during a doctor's appointment. The doctor's appointment may be an in-person appointment or a telehealth appointment that is conducted remotely.

The system 100 may have an encoder subsystem 110, a decoder subsystem 120, and a classification subsystem 130. The system 100 and its subsystems may be implemented one or more computers in one or more locations.

Together, the encoder subsystem 110 and the decoder subsystem 120 may form an automatic speech recognition ("ASR") system that generates a transcription of input speech. In general, the encoder subsystem 110 can generate high-level acoustic features from the input speech. The decoder subsystem 120 can consume the high-level acoustic features to generate probability distributions over character sequences. The system can sample from the probability distributions to generate a transcription of the input speech.

The encoder subsystem 110 can initially be trained on a task other than predicting behavioral or mental health states. For example, the encoder can be trained along with a decoder for the tasks of automatic speech recognition, emotion classification, sound classification, or the like. This training need not be perfect. Even partial training of the encoder may produce improved performance over not pre-training the encoder. After training the encoder, the decoder for the initial task can be discarded, and the encoder can be used for the intended task of predicting behavioral or mental health states of interest. This is known as transfer learning.

The encoder subsystem 110 may have a convolutional neural network ("CNN") 112. The CNN 112 may have convolutional layers and fully-connected layers. The CNN 112 may have at least about 1, 2, 3, 4, 5, 6, 7, 8, 9, 10, or more convolutional layers. The CNN may have at most about 10, 9, 8, 7, 6, 5, 4, 3, 2, or 1 convolutional layers. The CNN 112 may have at least about 1, 2, 3, 4, or more fully-connected layers. The CNN 112 may have at most about 4, 3, 2, or 1 full-connected layers. The inputs to the CNN 112 may be spectrogram features. The spectrogram features may have a window of 25 milliseconds and a frame rate of 10 milliseconds over 5 second segments of the input speech. In other cases, the inputs may be other front-end features. The CNN 112 may be a Visual Geometry Group ("VGG") network. The VGG network may improve the representation of the high-level acoustic features.

The LSTM network 114 may have at least about 1, 2, 3, 4, 5, 6, 7, 8, 9, 10, 15, 20, or more LSTM layers. The LSTM network 114 may have at least about 1, 2, 3, 4, 5, 6, or more fully-connected layers. The inputs to the LSTM network 114 may be the outputs of the CNN 112. The MFCCs may have a window of 25 milliseconds and a frame rate of 10 milliseconds over the entire input speech. In some cases, the LSTM network 114 may be a bidirectional LSTM (BLSTM)

The decoder subsystem 120 may have an attention layer 122 and an LSTM network 124 that receive the high-level acoustic features from the encoder subsystem 110. The attention unit 122 may allow the LSTM network 124 to focus on (or "attend to") subsets of the high-level acoustic features for every output step. The attention unit 122 and the LSTM network 124 can generate probability distributions over character sequences. The attention unit 122 and the LSTM network 124 can be trained using a connectionist temporal classification ("CTC") function. The decoder subsystem 120 may additionally have a beam search unit 126 that receives the probability distributions over character sequences from the LSTM network 124, traverses the possible transcriptions that result from the probability distributions, and selects the best transcription according to certain criterion.

In some cases, the decoder subsystem 120 may be used only during training of the system 100. That is, the decoder subsystem 120 may be deactivated or discarded during inference. Training of the system 100 will be described in more detail in reference to subsequent figures. The classifier network 132 may generate a decision over a single segment. To generate a decision for the whole session (consisting of many segments) the system may feed segment fusion module 140 with one of the internal layers of the classifier network 132 (usually one layer to the last). Segment fusion module 140 then may generate a single prediction for the entire session. In some embodiments, the segment fusion module can use MLP, LSTM, RCNN, random forest or similar approaches for the prediction. Segment fusion module 140 may also be used to combine different underlying models with each other, including models that differ in modality (acoustic, NLP, image processing, and so on).

The classification subsystem 130, like the decoder subsystem 120, can receive the high-level acoustic features from the encoder subsystem 110. The classification subsystem 130 can process the high-level acoustic features to predict whether the subject has a behavioral or mental health state of interest. More specifically, the output of the classification ("segment output") subsystem 130 may be a posterior probability of a segment of speech being from a subject with a condition of interest (e.g., depression or bipolar disorder). The classification subsystem 130 may have a classifier network 132. The classifier network 132 may be a recurrent CNN ("RCNN"), an LSTM with attention, a self-attention network, or a transformer. The classifier network 132 can perform regression, ordinal prediction, binary classification, multi-class classification, or the like. In the case of binary classification, the classifier network 132 can make a binary prediction about whether a subject has a behavioral or mental health disorder. In the case of multi-class classification, the classifier network 132 can predict a severity or level of a behavioral or mental health disorder in a subject (e.g., the subjects PHQ-9 score or GAD-7 score).

Figure 2:
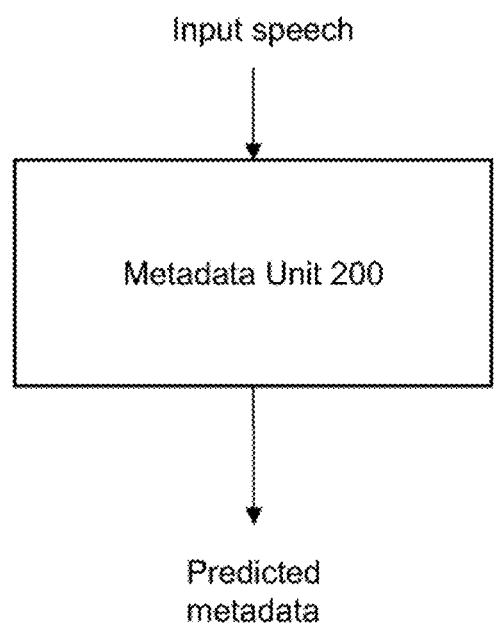
FIG. 2 schematically illustrates a metadata unit that is configured to predict metadata about the subject from the input speech.

The system 100 can use metadata and/or identity vector ("i-vectors") to more accurately predict whether the subject has behavioral or mental health state of interest. The metadata may be data about the subject, e.g., the subject's age, race, ethnicity, sex, gender, income, education, location, medical history, or the like. Such metadata may be indicative of the subject's behavioral or mental health state. The system 100 can obtain the metadata from a database, or it can predict the metadata from the input speech from the subject. FIG. 2 schematically illustrates a metadata unit 200 that is configured to make such predictions. The metadata unit 200 may have a plurality of different neural network classifiers that are each configured to predict a different type of metadata about the subject. For example, the metadata unit 200 may have one neural network classifier that is trained to predict the subject's age and another neural network classifier that is trained to predict the subject's location. In general, the metadata unit 200 can predict demographic data, past medical history, time of day, location, and the like. The acoustic model can use known or inferred metadata to better predict a patient's behavioral or mental health state.

In some cases, the metadata described above can be used to adapt or personalize the patient experience in the mental health application. For example, the font size in the mental health application can be increased if the patient is elderly. As another example, the wording of questions can be adjusted for certain demographic groups, such as those using a particular regional dialect or in a particular context (e.g., the system may use the word "roommate" when asking a college student about his home life).

Figure 3:
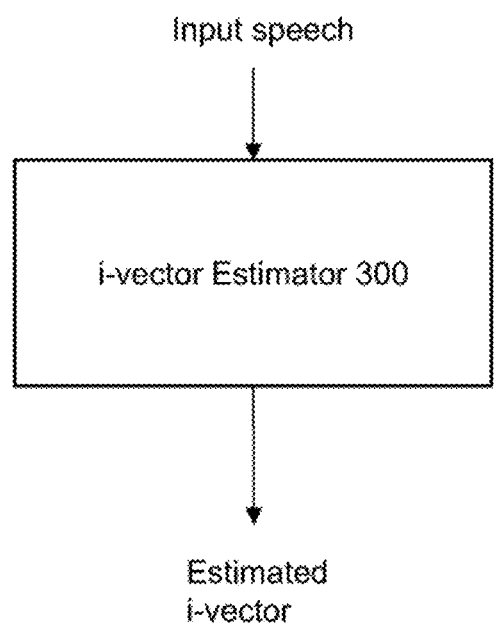
FIG. 3 schematically illustrates an i-vector estimator that is configured to estimate i-vectors from the input speech.

The i-vectors, meanwhile, may be low-dimensional features extracted from the input speech. FIG. 3 schematically illustrates an i-vector estimator 300 that is configured to estimate the i-vectors. The i-vector estimator 300 may use a Gaussian mixture model to estimate such i-vectors.

In some cases, the metadata and/or i-vectors may be appended to the high-level acoustic features from the encoder subsystem 110 before the high-level acoustic features are passed to the classification subsystem 130. In some other cases, the metadata and/or i-vectors may instead be appended to the output of the classifier network 132 and passed through a network 134. The network 134 may be a deep neural network ("DNN"), a random forest classifier, or a support vector machine ("SVM"), for example.

Alternatively, the system may use an end-to-end model with transfer learning. The first few layers (CNN and LSTMs) of this model may be initialized with the help of an ASR task. In doing so, the system may create a new network and train it with transcribed speech data. After pretraining the first layers of the model, the system may freeze them or keep updating their weights while training for the classification or prediction tasks. Pretraining the CNN and LSTM forces the neural network to learn a more restrictive representation relative to when the system trains all layers from scratch.

End-to-end models may produce outputs from individual audio segments. For an audio session comprising multiple of these segments, the system may produce an overall mental health prediction by averaging predictions from all of the segments comprising the session. In other embodiments, the system may fuse individual segments using an additional neural network. The segments may be represented by vectors that are the last hidden layers of the classification subsystem outputs. The sequence of segments for every session may be projected into a single vector by max pooling and then fed into an additional network (e.g., an MLP network). The model may then be trained either for classification or regression tasks.

The system may use an automated speech recognition (ASR) task to pretrain the first few layers of the network. The pretraining steps may enable the network to start from a successfully-working feature representation. Even using a "weak" (large character error rate) model to pretrain the first few layers may achieve a significant performance gain.

The final layer (not depicted) of the classification subsystem 130 may be a softmax layer that is configured to generate a probability distribution over a plurality of output classes, e.g., behavioral or mental health states.

The acoustic model described above may have a specificity of at least about 60%, 65%, 70%, 80%, 85%, 90%, 95%, or more. The acoustic model may have a sensitivity of at least about 60%, 65%, 70%, 80%, 85%, 90%, 95%, or more. Increasing the specificity of the acoustic model may require decreasing the sensitivity, and vice versa. The acoustic model may have an area-under-the-curve ("AUC") of at least about 60%, 65%, 70%, 80%, 85%, 90%, 95%, or more. The acoustic model may provide a relative performance (e.g., sensitivity, specificity, or AUC) improvement of at least about 1%, 2%, 3%, 4%, 5%, 10%, 15%, 20%, 25%, or more over prior systems.

Figure 7:
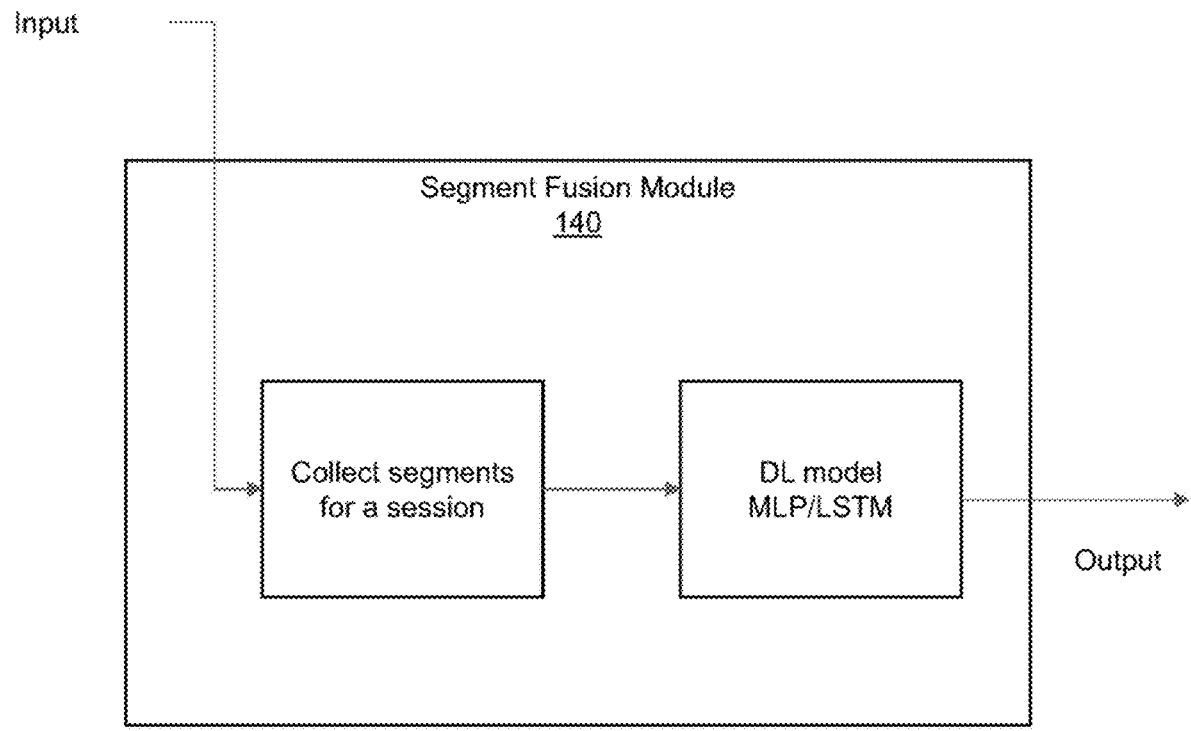
FIG. 7 schematically illustrates a segment fusion module.

FIG. 7 schematically illustrates the segment fusion module 140. The segment fusion module 140 may receive an input, which is an output from the classification subsystem. The input may reflect a classification result from an individual audio segment. The process may collect multiple such segments comprising an audio session with a patient. The system may sequence the segments and then project them into a single vector using max pooling, and then feed them into a deep learning network, such as a multi-layer perceptron ("MLP") network. The model may then produce an output prediction for the overall session from the machine learning analysis performed on the sequence of segments. The segment fusion module 140 may fuse the learned representation form of each segment (output of the classifier) over all segments of speech in a given session, to obtain the overall prediction for that session. In its simplest form, the segment fusion module 140 may just compute the average prediction over all segments. In more complex versions, the module may receive a learned representation that corresponds to each speech segment in a session and combine (fuse) these representations using a machine learning model. The learned representation may correspond to an internal layer of a classifier for the speech segments. Combination or fusion models may include MLP, LSTM, RCNN, and other similar models. Additionally, the segment fusion module 140 may be used to combine results of multi-modal inputs, for example it may be used to combine acoustic segments, NLP and vision for a final decision that involves all modalities.

The subsystems of FIG. 1 may be implemented on one or more computing devices. The computing devices may be servers, desktop or laptop computers, electronic tablets, mobile devices, or the like. The computing devices may be located in one or more locations. The computing devices may have general-purpose processors, graphics processing units (GPU), application-specific integrated circuits (ASIC), field-programmable gate-arrays (FPGA), machine learning accelerators, or the like. The computing devices may additionally have memory, e.g., dynamic or static random-access memory, read-only memory, flash memory, hard drives, or the like. The memory may be configured to store instructions that, upon execution, cause the computing devices to train the system 100 or predict whether a subject has a behavioral or mental health state of interest. The computing devices may additionally have network communication devices. The network communication devices can enable the computing devices to communicate with each other and with any number of user devices, over a network. For example, the network communication devices may allow the computing devices that implement the system 100 to communicate with health care professionals' mobile devices regarding the predicted behavioral or mental health states of subjects. The network may be a wired or wireless network. For example, the network may be a fiber optic network, Ethernet® network, a satellite network, a cellular network, a Wi-Fi® network, a Bluetooth® network, or the like. In other implementations, the computing devices may be several distributed computing devices that are accessible through the Internet. Such computing devices may be considered cloud computing devices.

Training Acoustic Models

Figure 4:
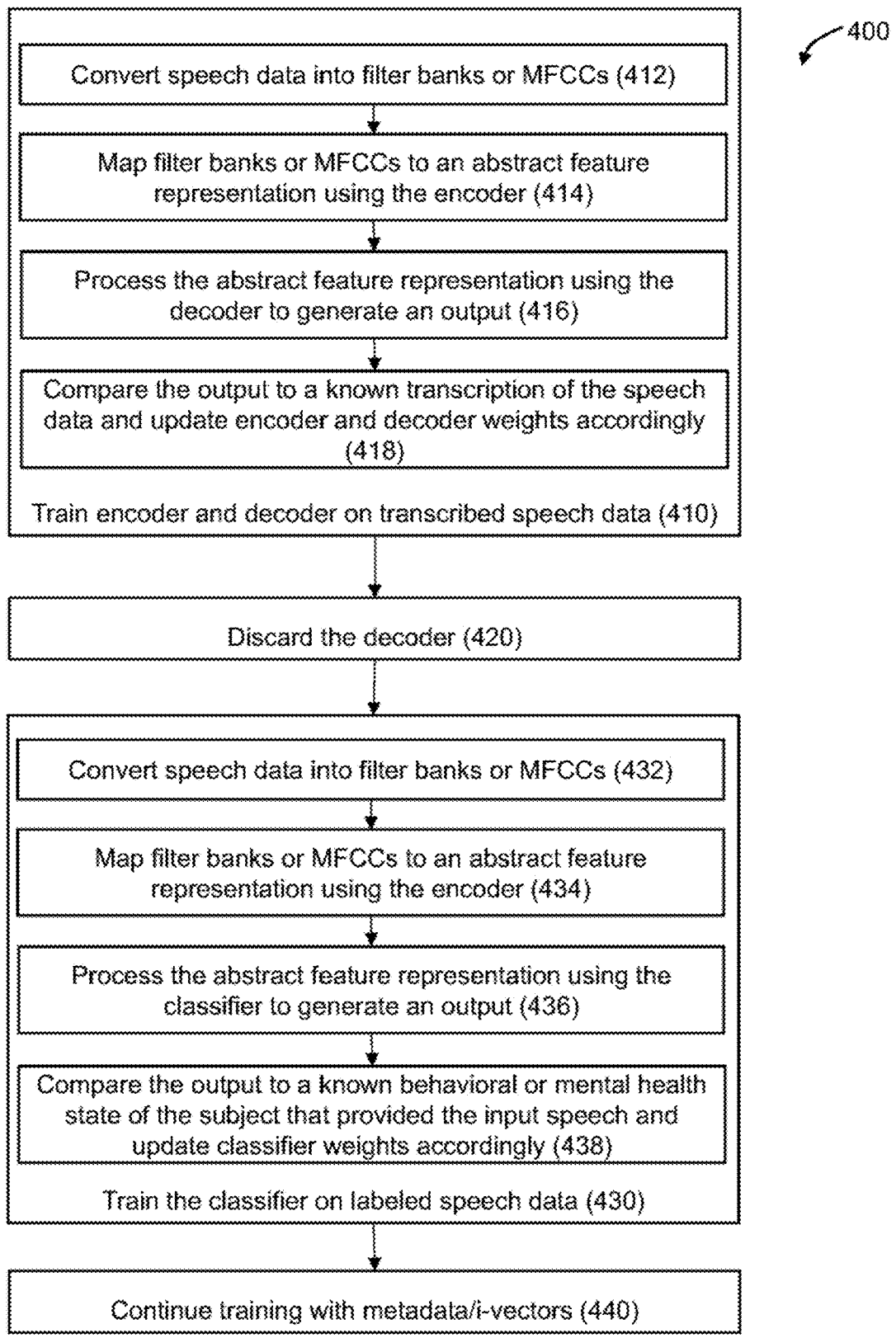
FIG. 4 is a flow chart of an example process for training the system of FIG. 1.

FIG. 4 is a flow chart of an example process 400 for training the system 100. The process 400 can be performed by a system of one or more computers in one or more locations. Such computers will collectively be referred to as a "training system" in reference to FIG. 4.

In an operation 410, the training system can train the encoder subsystem 110 and the decoder subsystem 120 to transcribe speech data. The training data may comprise raw speech data and corresponding transcriptions of that raw speech data. The raw speech data may be unrelated to behavioral or mental health topics. The raw speech data may be unlabeled. That is, the raw speech data may originate from speakers whose mental or behavioral states are unknown. In some cases, the training data may originate from public audio corpora. Operation 410 may be a supervised learning operation.

In a sub-operation 412 of operation 410, the training system can convert raw speech data into filter banks or mel-frequency cepstrum coefficients ("MFCCs"). In a sub-operation 414 of operation 410, the training system can cause the encoder subsystem 110 to map the filer banks or MFCCs into a robust abstract feature representation. In a sub-operation 416 of operation 410, the training system can cause the decoder subsystem 120 to process the abstract feature representation to generate an output. In a sub-operation 418 of operation 410, the training system can compare the output of the decoder subsystem 120 to the known transcription of the speech data and update the weights and biases in the encoder subsystem 110 and the decoder subsystem 120 to account for the difference. More specifically, the training system can use a cost function to calculate a difference between the generated output and the known transcription. By computing the derivative of the cost function with respect to the weights and biases of the encoder and decoder subsystems, the training system can iteratively adjust the weights and biases over multiple cycles to minimize the cost function. Training may be complete when the generated outputs satisfy a convergence condition, such as obtaining a small magnitude of calculated cost.

In an operation 420, the training system can disregard or discard the decoder subsystem 120. In other words, the decoder subsystem 120 may not be used for the remainder of the training operations or for inference.

In an operation 430, the training system can train the classifier subsystem 130 on labeled speech data. The labeled speech data may be speech data that is labeled as originating or not originating from a subject that has been determined to have a behavioral or mental health state of interest. The behavioral or mental health state of interest may be any such state described herein. The labels may be clinical diagnoses, scores from standardized mental health questionnaires (e.g., PHQ-9), or the like. In some cases, the classifier subsystem 130 can be trained to predict subclasses of a behavioral or mental health condition using answers to a specific subset of questions from a standardized mental health questionnaire (e.g., only questions 1 and 2 on PHQ-9). Like the operation 410, the operation 430 may be a supervised learning operation. In a sub-operation 432 of the operation 430, the training system can convert the raw speech data into filter banks or MFCCs. In a sub-operation 434, the training subsystem can cause the previously trained encoder subsystem 110 to generate an abstract feature representation of the speech data. In a sub-operation 436 of operation 430, the training subsystem can cause the classification subsystem 130 to generate, from the abstract feature representation, an output indicative of the behavioral or mental health state of the subject from which the speech data originated. In a sub-operation 438 of operation 430, the training system can compare the output to the known behavioral or mental health state of the subject and update the weights and biases in the classification subsystem 130 to account for the difference. The training system can repeat this process for many speech samples until the outputs of classification subsystem 130 satisfy a convergence condition.

In the operation 430, the encoder subsystem 110 may be fixed. That is, its weights and biases may not be updated. Alternatively, the weights and biases of the encoder subsystem 110 may be adjusted in concert with the weights and biases of the classification subsystem 130, particularly if a lot of labeled speech data is available. This may result in a more robust system.

If the system uses metadata and/or i-vectors to predict the behavioral or mental health state of a subject, the training system can initialize the metadata and/or i-vectors to zero during training operations 410-430. In an operation 440, the training system can add the metadata and/or i-vectors before the classification subsystem 130 or after the classifier network 132 and continue training. If the system 100 is configured such that the metadata and/or i-vectors are appended to the output of the encoder subsystem 110, the training system can continue to train the entire classification subsystem 130 on such output and the appended metadata and/or i-vectors. Alternatively, if the system 100 is configured such that the metadata and/or i-vectors are appended to the output of the classifier network 132, the training system can train only the network 134.

The process 400 is a transfer learning process in which, in operation 410, the encoder is trained to perform one task (i.e., automatic speech recognition) using a first training dataset and, in operation 430, the encoder and classifier are trained to perform a second task (i.e., predicting a mental or behavioral state of a subject) using a second training dataset. Pretraining the encoder to perform the first task may be beneficial because it may be difficult to obtain a sufficient amount of clinically-labeled speech data to have a robust second training dataset. In the embodiment of FIG. 4, the first task is automatic speech recognition. In other embodiments, however, the first task may be emotion classification, sound classification, or the like.

Figure 5:
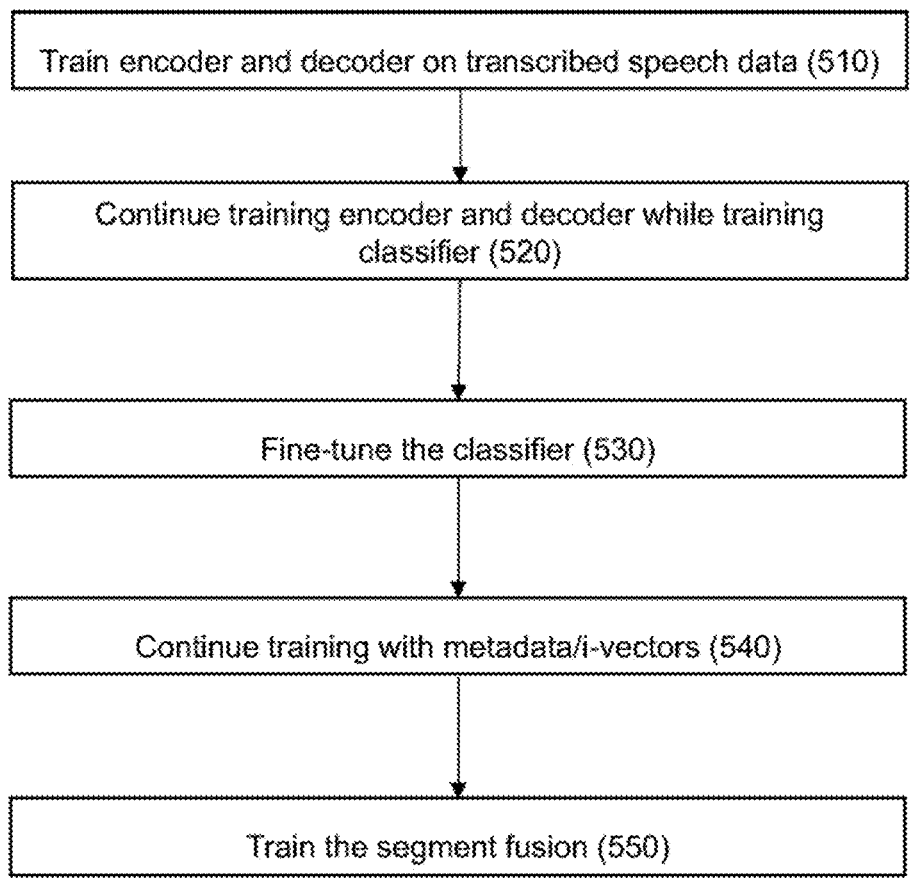
FIG. 5 is a flow chart of another example process for training the system of FIG. 1.

FIG. 5 is a flow chart of an example process 500 for training the system 100. The process 500 may be an alternative to the process 400. The process 500 can be performed by a system of one or more computers in one or more locations. Such computers will collectively be referred to as a "training system" in reference to FIG. 5.

In an operation 510, the training system can train the encoder subsystem 110 and the decoder subsystem 120 on transcribed speech data. Operation 510 may be the same as or similar to operation 410 of FIG. 4. In an operation 520, the training system can continue to train the encoder subsystem 110 and the decoder subsystem 120 while training the classifier 130 on speech data labeled with the behavioral or mental health state of the speaker from which the speech data originates. During operation 520, the contribution of the classification subsystem 130 to the cost function relative to the contribution of encoder and decoder subsystems may increase. So in an operation 530, the training system can fine-tune the classification subsystem 130 by fixing the encoder subsystem 110 and disregarding or discarding the decoder subsystem 120.

If the system 100 is configured such that the metadata and/or i-vectors are appended to the output of the classifier network 132, the training system can perform an operation 540 during which the metadata and/or i-vectors are so appended and the training system either (i) freezes the classifier network 132 and trains only the network 134 or (ii) continues to train the classifier network 132 while also training the network 134. In operation 550, the training system trains the model for segment fusion. The system may precede training with projecting sequences of segment outputs for various segments into a single vector.

Acoustic Model Example 1

In one example, the acoustic model of FIG. 1 was used to predict anxiety and depression in a group of test subjects. The classifier of the acoustic model was trained to make a binary classification. The encoder of the acoustic model was pretrained to perform an automatic speech recognition task as described in FIG. 4. Two different models were pretrained: one in which only the encoder weights were updated ("first model") and one in which both the encoder and decoder weights were updated ("second model"). The subjects had each taken the Patient Health Questionnaire-8 (i.e., the PHQ-9 with the suicidality question removed), which served as a depression label, and the General Anxiety Disorder-7, which served as an anxiety label. The first model predicted depression with a specificity of 0.71, a sensitivity of 0.71, an AUC of 0.79, and an F1 of 0.54. The second model predicted depression with a specificity of 0.72, a sensitivity of 0.72, and an AUC of 0.79. The second model predicted anxiety with a specificity of 0.68, a sensitivity of 0.69, an AUC of 0.75, and an F1 of 0.49.

The use of transfer learning improved the performance of the acoustic model by 27% for depression classification relative to an acoustic model trained without transfer learning, from an AUC of 0.62 to an AUC of 0.79.

Natural Language Processing Models

The present disclosure also provides systems and methods for predicting, using natural language processing models ("NLP"), whether a subject has a behavioral or mental health condition. The system can obtain a speech sample from the subject. The subject may provide the speech sample in response to prompts about the subject's work or home life. The system can process the speech sample using an NLP model to predict whether the subject has the behavioral or mental health condition. The NLP model may be trained in different stages on a combination of generic text, domain-specific text, and speech samples from a plurality of subjects. The speech samples may be associated with clinical labels that indicate whether the subjects who provided the speech samples have the behavioral or mental health condition. The clinical labels may be based on the results of standardized health questionnaires, e.g., the Patient Health Questionnaire-9 ("PHQ-9"). In some cases, the clinical labels may be answers to subsets of questions from the PHQ-9 (e.g., only answers to questions 1 and 2 on PHQ-9), which may be used to predict a subclass of depression. Alternatively, the clinical labels may be based on diagnoses from clinicians.

Figure 9:
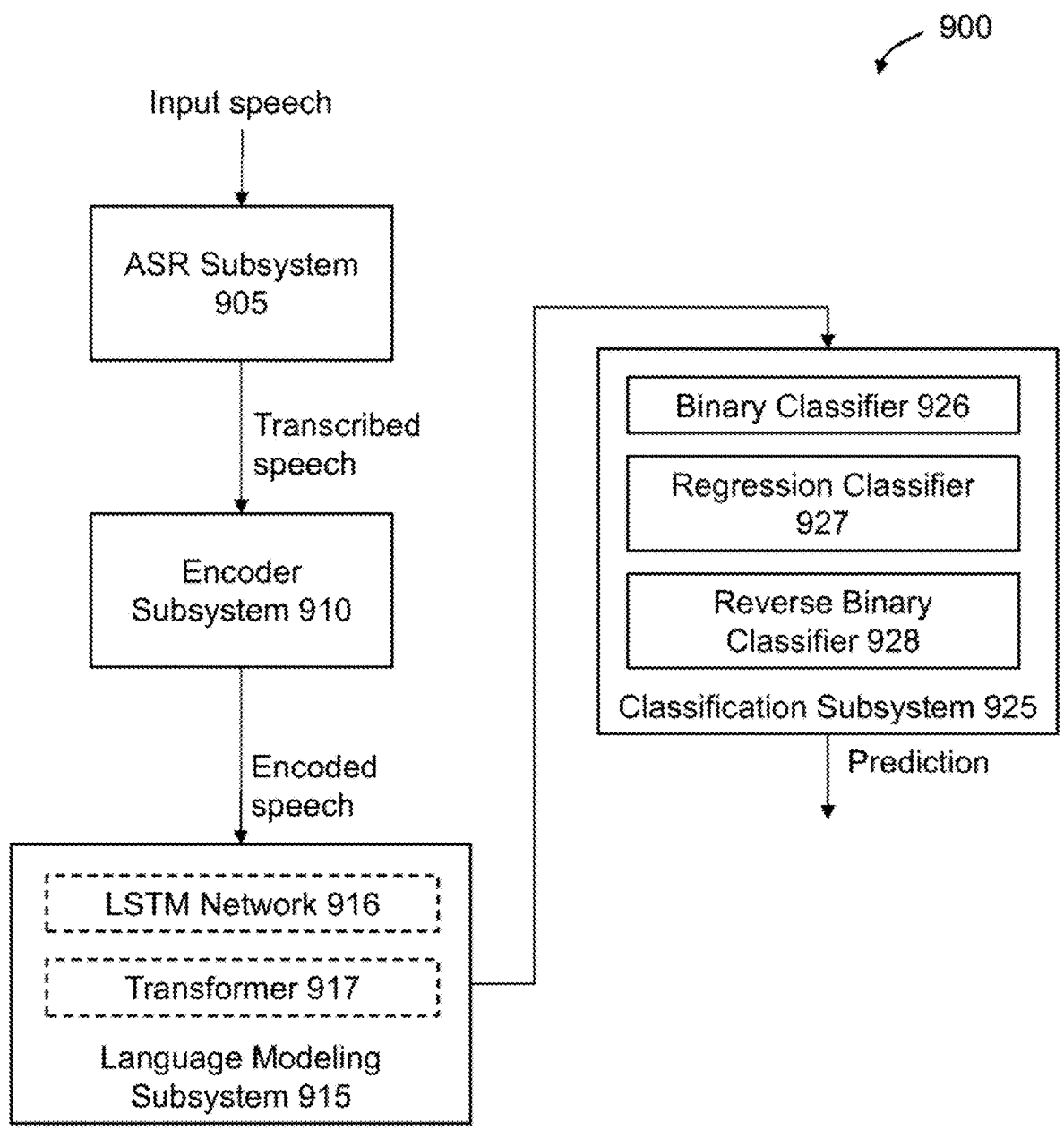
FIG. 9 schematically illustrates a system for predicting whether a subject has a behavioral or mental health condition using a natural language processing ("NLP") model.

FIG. 9 schematically illustrates a system 900 for predicting whether a subject has a behavioral or mental health condition using an NLP model. The condition may be one that is clinically-defined in the Diagnostic and Statistical Manual of Mental Disorders ("DSM") or other similar authoritative source, or it may be a condition that is associated or comorbid with a condition defined in the DSM. For example, the condition may be fatigue, loneliness, low motivation, stress, depression, anxiety, drug or alcohol addiction, post-traumatic stress condition ("PTSD"), schizophrenia, bipolar condition, dementia, suicidality, or the like.

The system 900 may include an automatic speech recognition ("ASR") subsystem 905, an encoder subsystem 910, a language model subsystem 915, and a classification subsystem 925.

The ASR subsystem 905 can generate a transcription of input speech from the subject. In some cases, the ASR subsystem 905 may include a third-party ASR model, e.g., Google ASR. The third-party ASR may be a 1-best hypothesis ASR, or it may take into account word uncertainty or may include word confusion information. In other cases, the ASR subsystem 905 may include a custom ASR model.

The system 900 can obtain the input speech in a number of different ways. The system 900 can obtain the input speech by transmitting one or more queries to the subject. The system 900 can transmit the queries in an audio format, a visual format, or an audiovisual format. For example, the system 900 can transmit the queries through an electronic display and a speaker of the subject's computing device. The queries may relate to the subject's mood, sleep, appetite, energy level, personal relationships, work, medical history, medications, and the like. In some cases, the queries may be or be based on questions from a standardized questionnaire mental health questionnaire, e.g., the PHQ-9 or the General Anxiety Condition-7 ("GAD-7"). In some cases, the system 900 can transmit the queries to the subject as part of a dynamic conversation with the subject. That is, each query may be based on previous queries and the subject's responses to such previous queries. In other cases, the queries and their order may be pre-defined. Additionally or alternatively, the system 900 can obtain the input speech by passively listening to the subject. The system 900 can passively listen to the subject during ordinary daily activities or during a conversation with a health care provider, for example. The subject's response to the queries may serve as the input speech to the ASR subsystem 905.

The encoder subsystem 910 can convert transcribed speech from the ASR subsystem 905 into vectors of real numbers (i.e., embeddings) in a continuous vector space. The vectors may represent individual words. Vectors that are close to each other in the vector space may represent words that are semantically similar in that such words often appear together in text or are otherwise associated with each other. The encoder subsystem 910 can use a number of different models or techniques to convert transcribed speech to vectors. For example, the encoder subsystem 910 can use an n-gram or skip-gram model, a feedforward or recurrent neural network, matrix factorization, byte pair encoding, sub-word regularization, or any combination of such models and techniques. These models and techniques are described in more detail in the following papers, which are incorporated herein by reference: T. Mikolov et al., *Distributed Representations of Words and Phrases and their Compositionality*, 2013, https://arxiv.org/pdf/1310.4546.pdf; J. Pennington et al., *GloVe: Global Vectors for Word Representation*, 2014, https://nlp.stanford.edu/pubs/glove.pdf; R. Sennrich et al., *Neural Machine Translation of Rare Words with Subword Units*, 2015, https://arxiv.org/pdf/1508.07909.pdf; T. Kudo, Subword Regularization: Improving Neural Network Translation Models with Multiple Subword Candidates, 2018, https://arxiv.org/pdf/1804.10959.pdf. The encoder subsystem 910 can convert words, syllables, phenomes, or characters from the transcribed speech into vectors, depending on the particular model or technique the encoder subsystem 910 uses.

The language model subsystem 915 can process the vectors generated by the encoder subsystem 910 and additional metadata information, e.g., metadata about the subject that provided the speech (e.g., age, sex, gender, ethnicity, location, income, medical history, etc.) or metadata about the queries and the subject's responses to those queries (e.g., order of questions, types of questions, etc.). The language model subsystem 915 may have a long short-term memory ("LSTM") network 916. An LSTM network is a type of recurrent neural network ("RNN"). RNNs are neural networks with cyclical connections that can encode dependencies in time-series data, e.g., in speech data. An RNN can include an input layer that is configured to receive a sequence of time-series inputs. An RNN may additionally include one or more hidden recurrent layers that maintain a state. At each time step, each hidden recurrent layer can compute an output and a next state for the layer. The next state may depend on the previous state and the current input. The state may be maintained across time steps and may capture dependencies in the input sequence.

An LSTM network may be made of LSTM units. An LSTM unit may include of a cell, an input gate, an output gate, and a forget gate. The cell may be responsible for keeping track of the dependencies between the elements in the input sequence. The input gate can control the extent to which a new value flows into the cell, the forget gate can control the extent to which a value remains in the cell, and the output gate can control the extent to which the value in the cell is used to compute the output activation of the LSTM unit. The activation function of the LSTM gate may be the logistic function.

Alternatively, the language model subsystem 915 may have a transformer 917. The transformer 917 may be a model without recurrent connections. Instead, it may rely on an attention mechanism. Attention mechanisms may focus on, or "attend to," certain input regions while ignoring others. This may increase model performance because certain input regions may be less relevant. At each time step, an attention unit can compute a dot product of a context vector and the input at the time step, among other operations. The output of the attention unit may define where the most relevant information in the input sequence is located. Transformers are described in more detail in A. Vaswani et al., Attention is All You Need, 2017, https://arxiv.org/pdf/1706.03762.pdf, which is incorporated herein by reference and reproduced in Appendix A. The transformer 917 may rely on non-language-related metadata information in determining what input regions to attend to.

The classification subsystem 925 may have a binary classifier 926, a regression classifier 927, and a reverse binary classifier 928. Each of the three classifiers may be trained for a different purpose. The binary classifier 926 may be trained to classify the subject as having the behavioral or mental or not having the behavioral health condition. The regression classifier 927 may be trained to predict the behavioral or mental health condition along a scale, e.g., along the PHQ-9 scale for depression. A softmax function may be applied to the output layer of the regression classifier 927 to generate a probability distribution over the possible scores, e.g., the 28 possible scores of 0 to 27 for PHQ-9. The reverse binary classifier 928, like the binary classifier 926, may be trained to classify the subject as having the behavioral or mental or not having the behavioral health condition, but it may be trained on transcribed speech in which the words are reversed (e.g., "My name is Michael Jordan" to "Jordan Michael is name my"). This approach may enable the system 900 to capture words dependencies that the binary classifier 926 does not.

Inference may be repeated up to 10 times for a subject. In each iteration, the system 900 can concatenate the subject's responses in a different order. This creates various permutations of the same session driven by the reordering of responses. The classifiers 926, 927, and 928 may return slightly different outputs in each iteration. The system 900 can then optimize the results by averaging or performing other statistical analysis on the outputs. Ultimately, the system 900 can combine the outputs of the three classifiers to generate a final prediction. The system 900 may make more accurate predictions for subjects who participate in multiple sessions.

The NLP model described above may have a specificity of at least about 60%, 65%, 70%, 80%, 85%, 90%, 95%, or more. The NLP model may have a sensitivity of at least about 60%, 65%, 70%, 80%, 85%, 90%, 95%, or more. Increasing the specificity of the acoustic model may require decreasing the sensitivity, and vice versa. The NLP model may have an AUC of at least about 60%, 65%, 70%, 80%, 85%, 90%, 95%, or more. The NLP model may provide a relative performance (e.g., sensitivity, specificity, or AUC) improvement of at least about 1%, 2%, 3%, 4%, 5%, 10%, 15%, 20%, 25%, or more over prior systems.

The subsystems of FIG. 9 and their components may be implemented on one or more computing devices. The computing devices may be servers, desktop or laptop computers, electronic tablets, mobile devices, or the like. The computing devices may be located in one or more locations. The computing devices may have general-purpose processors, graphics processing units (GPU), application-specific integrated circuits (ASIC), field-programmable gate-arrays (FPGA), or the like. The computing devices may additionally have memory, e.g., dynamic or static random-access memory, read-only memory, flash memory, hard drives, or the like. The memory may be configured to store instructions that, upon execution, cause the computing devices to implement the functionality of the subsystems. The computing devices may additionally have network communication devices. The network communication devices may enable the computing devices to communicate with each other and with any number of user devices, over a network. The network may be a wired or wireless network. For example, the network may be a fiber optic network, Ethernet® network, a satellite network, a cellular network, a Wi-Fi® network, a Bluetooth® network, or the like. In other implementations, the computing devices may be several distributed computing devices that are accessible through the Internet. Such computing devices may be considered cloud computing devices.

Training NLP Models

Figure 10:
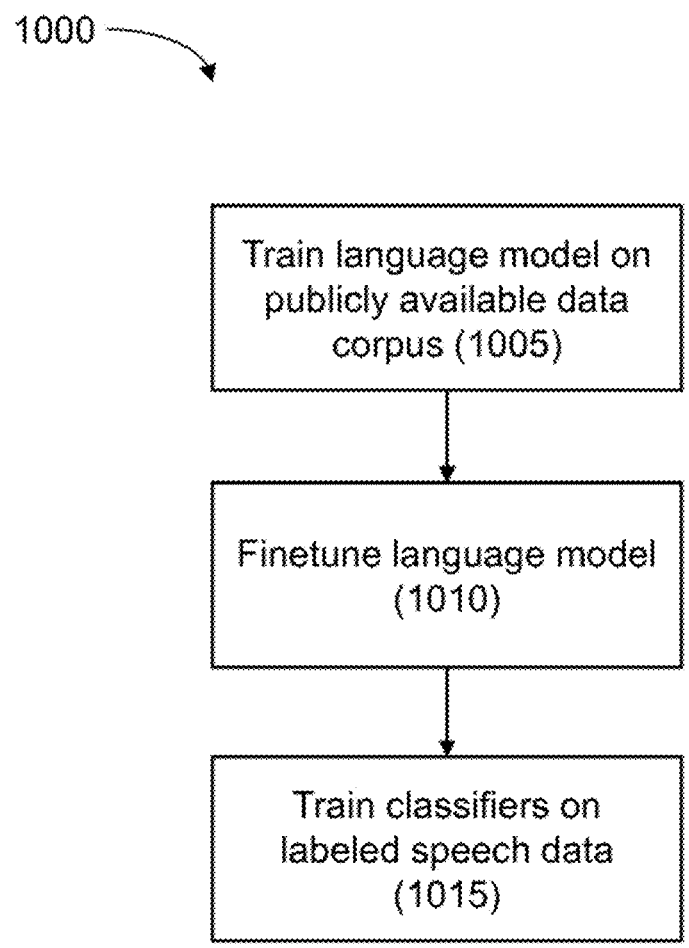
FIG. 10 is a flow chart of an example process for training the NLP model of FIG. 9.

FIG. 10 is a flow chart of an example process 1000 for training the models in the system 900. The process 1000 can be performed by a system of one or more computers in one or more locations.

The system can train the LSTM network 916 or the transformer 917 on a publicly available data corpus (1005). The publicly available data corpus may be a text corpus. The text corpus may not necessarily be related to behavioral or mental health. Instead, the text corpus may be a general-purpose text corpus. The text corpus may be large, and it may capture general properties of the language of the text. In one example, the text corpus may include Wikipedia articles. The training task in operation 1005 may be language modeling, e.g., training the LSTM network 916 or the transformer 917 to a predict a next word in a sequence of words. The output of the LSTM network 916 or the transformer 917 may be a probability distribution over a plurality of words.

The training in operation 1005 may include dropout and DropConnect operations. Dropout is a process by which a random subset of nodes in a neural network is removed during training. A different subset may be removed for each training example. DropConnect is a process by which random subset of weights are removed (i.e., set to zero) during training. As with dropout, a different subset may be removed for each training example. Dropout and DropConnect may help to prevent overfitting.

The training in operation 1005 may additionally include a non-monotonical average stochastic gradient descent (SGD) process. SGD is the process of reducing training loss by iteratively adjusting model weights through scaled gradient steps. The training of deep networks may be posed as the non-convex optimization problem min $$\frac{1}{N}\sum_{i=1}^{N} f_{i(w)},$$

where $f_i$ is the loss function for the $i^{th}$ data point, w are the weights of the network, and the expectation is taken over the data. Given a sequence of learning rates, $\gamma_k$, SGD iteratively takes steps of the form $w_{k+1}=w_k-\gamma_k \nabla \hat{f}(w_k)$. Average SGD is similar to SGD except that instead of returning the last iterate as the solution, average SGD returns $$\frac{1}{K-T+1}\sum_{k=T}^{K} w_i$$

where K is the total number of iterations and T<K is a user-specified averaging trigger. Non-monotonical average SGD may involve adjusting the learning rate after a performance metric fails to improve for multiple cycles. Dropout, DropConnect, and non-monotonical SGD are described in greater in S. Merity et al., *Regularizing and Optimizing LSTM Language Models*, 2017, https://arxiv.org/pdf/1708.02182.pdf which is incorporated herein by reference and reproduced in Appendix A.

Following the training in operation 1005, the system can finetune the LSTM network 916 or the transformer 917 for the target task, i.e., detecting behavioral and mental health conditions (1010). Operation 1010 may involve training the LSTM network 916 or the transformer 917 on a domain-specific data corpus. The domain-specific data corpus may include, for example, text about behavioral and mental health conditions, transcribed speech data from patients being tested for such behavioral and mental conditions, and additional non-language metadata information about the domain-specific data corpus (e.g., its source). The domain-specific corpus may include text about a specific condition for single task learning, or it may include text about multiple different conditions for multi-task learning.

The training in operation 1010 may include discriminative fine-tuning. Because different layers in the LSTM network 916 or the transformer 917 may capture different types of information, the different layers may benefit from having different learning rates. In general, deeper layers may benefit from higher learning rates. The learning rate of a particular layer may also be adjusted over time. In one example, the system increases the learning rate linearly until a condition is met and then decreases the rate linearly. This technique may be referred to as "slanted triangular learning rates" ("STLR"). This process is described in greater detail in J. Howard et al., *Universal Language Model Finetuning for Text Classification*, 2018, https://arxiv.org/pdf/1801.06146.pdf, which is incorporated herein by reference and reproduced in Appendix A.

The training in operation 1010 may additionally involve gradually unfreezing the language model, backpropagation through time to handle longer language dependencies, and pooling of multiple times in the LSTM network 916.

Following the fine-tuning in operation 1010, the system can train the classifiers 926, 927, and 928 to perform their respective tasks (1015). The training in operation 1015 may be an end-to-end process involving an ASR model, an encoder model, the LSTM network 916 or transformer 917, and/or one of the classifiers 926, 927, or 928, etc. However, the classifiers 926, 927, and 928 may or may not be trained independently of each other.

The training data may be labeled speech samples that are transcribed and encoded, in addition to some metadata information, e.g., metadata about the subject that provided the speech. The speech samples may be collected in the manner described in reference to FIG. 9, i.e., by transmitting a series of queries to subjects. The system may concatenate a particular subject's responses in random order for training. The order may be different for each of the classifiers 926, 927, and 928. This technique may help to mitigate a scarcity of speech samples. Labels for the speech samples may be obtained by administering the PHQ-9 to the subjects.

NLP Example 1

In a first example, we collected speech from approximately 11,000 unique subjects over approximately 16,000 sessions. Some subjects participated in multiple sessions. The subjects ranged in age from 18 to over 65, with a mean of approximately 30. The subjects provided the speech samples in response to prompts presented through a software application. The prompts related to such topics as "work" and "home life." Each session included between 4 and 6 prompts, with a mean of 4.52 prompts, and the resulting sessions lasted an average of approximately 5 minutes each.

In addition to answering the prompts, each subject completed the PHQ-9 with the suicidality question removed ("PHQ-8") and the GAD-7. The results of these standardized questionnaires served as depression and anxiety labels, respectively, for the speech samples. For both PHQ-8 and GAD-7, scores above 10 were mapped to presence of the condition, and scores below 10 were mapped to absence of the condition. Table 1 provides statistics for both the training data described above and the test data, with "−" denoting the absence of the condition and "+" denoting the presence of condition.

TABLE 1

|  | Total | Train− | Train+ | Test− | Test+ |
|---|---|---|---|---|---|
| PHQ-8 | | | | | |
| Responses | 72369 | 41558 | 16277 | 11395 | 3139 |
| Sessions | 15950 | 9266 | 3606 | 2425 | 653 |
| GAD-7 | | | | | |
| Responses | 72369 | 42662 | 15173 | 11539 | 2995 |
| Sessions | 15950 | 9538 | 3334 | 2460 | 618 |

Table 2 provides statistics on the cooccurrence of depression and anxiety in both the training data and the test data, with training data in bold text. The statistics show that 18.5% of the approximately 16,000 training data sessions resulted in positive labels for both depression and anxiety, while 14% of the test data session resulted in positive labels for both. Approximately 15% of training data sessions resulted in "mismatched" labels, i.e., labels that were positive for depression or anxiety but not both.

TABLE 2

|  | Anxiety+ | Anxiety− |
|---|---|---|
| Depression+ | 2964 (18.5%)/455 (14.7%) | 1295 (8.1%)/198 (6.4%) |
| Depression− | 988 (6.1%)/163 (5.2%) | 10703 (67.1%)/2262 (73.4%) |

Figure 11:
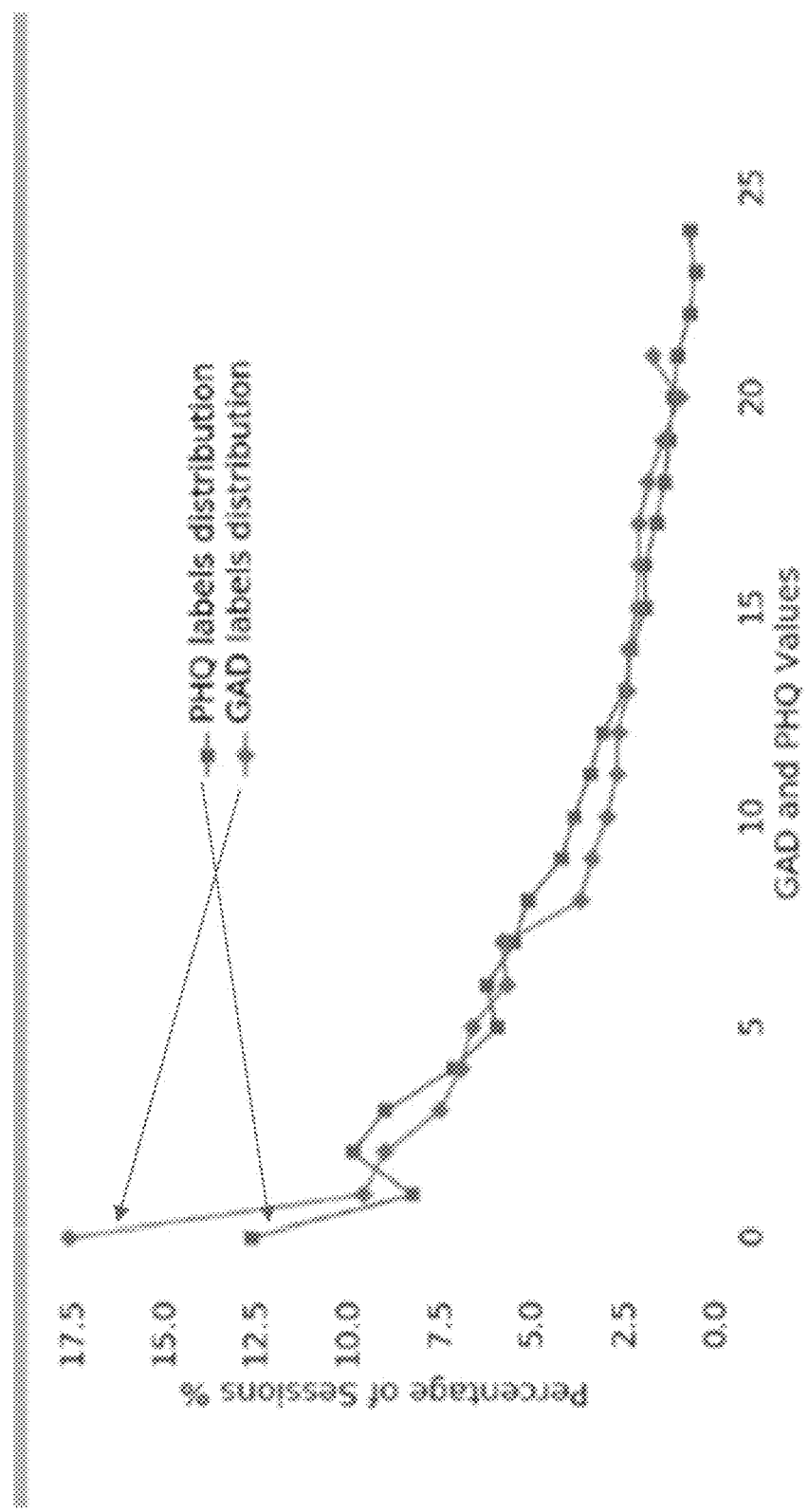
FIG. 11 is a chart that shows a distribution of Patient Health Questionnaire-8 ("PHQ-8") and Generalized Anxiety Disorder-7 ("GAD-7") scores in data sets.

FIG. 11 shows the percentage distribution of raw PHQ-8 and GAD-7 scores in the training and test data sets. The largest difference is for PHQ-8 and GAD-7 scores of 0, where there is a 5% discrepancy. The overall correlation between PHQ-8 and GAD-7 after they have been normalized in is 0.80.

FIG. 12 is a matrix of PHQ-8 and GAD-7 scores from the training and test data sessions. Note the difference in score ranges. Each question has 4 possible scores (i.e., 0, 1, 2, 3). Therefore, GAD-7 scores range from 0 to 21 and PHQ-8 scores range from 0 to 24. Within each scale, higher values indicate higher condition severity. As depicted in FIG. 12, the majority of sessions occur near the diagonal, consistent with high correlation of the two mental health conditions. Also, there is a greater variation of PHQ-8 labels for each GAD-7 label rather than vice versa. That is, there is more variability in rows than in columns in FIG. 12. This may reflect the fact that anxiety tends to be a precondition for depression.

After training and fine-tuning a language model as described in reference to operations 1005 and 1010 of FIG. 10, we used the training data described above to train a classifier according to operation 1015. One group of classifiers was trained to detect anxiety, and another was trained to detect depression. Then, we used the test data to test the trained models.

Figure 13:
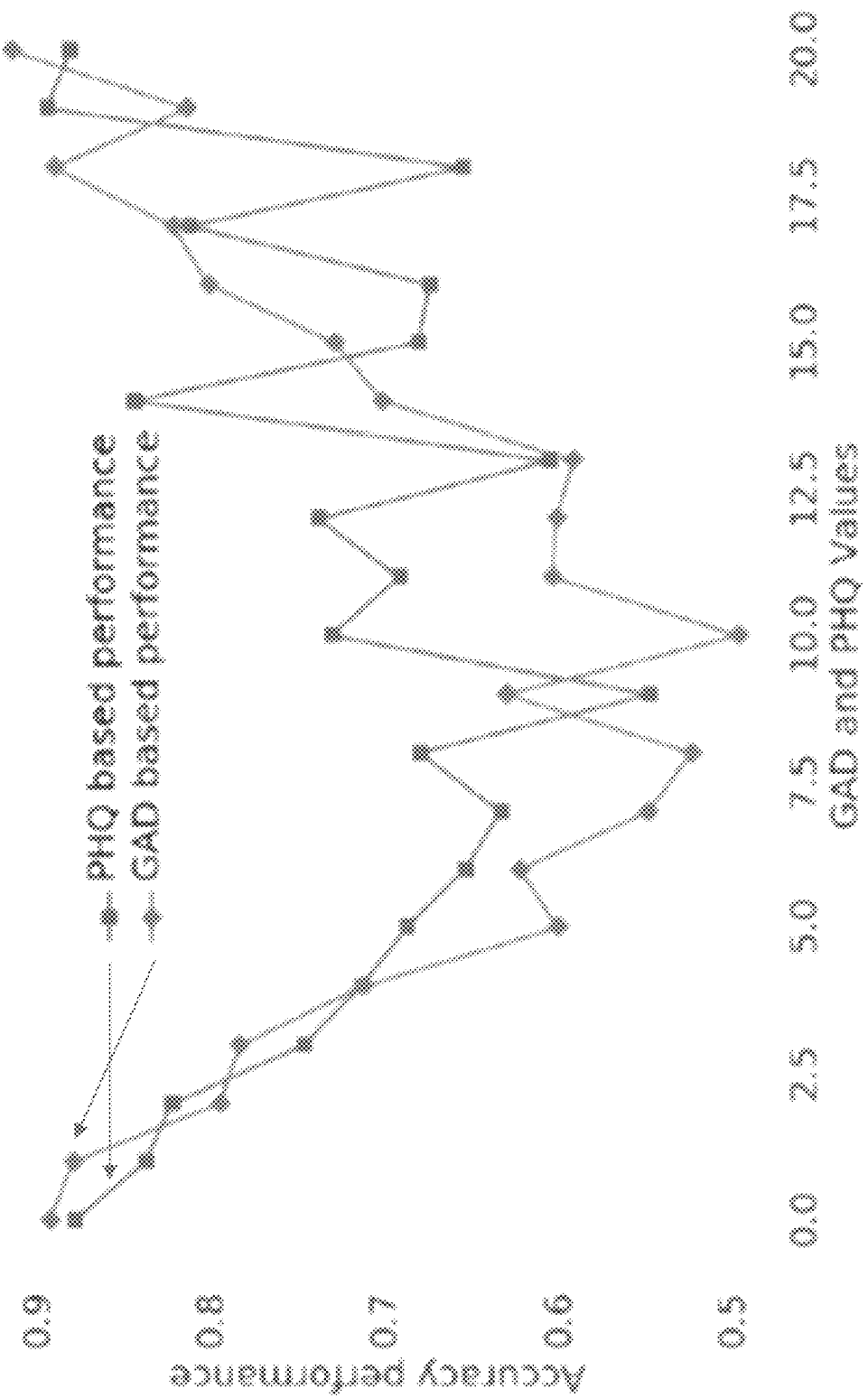
FIG. 13 is a chart that shows the accuracy of trained models in predicting raw PHQ-8 and GAD-7 scores.

FIG. 13 is a chart that shows the accuracy of the trained models in predicting raw PHQ-8 and GAD-7 scores. The models are most accurate in predicting low scores and high scores and least accurate in predicting scores between 8 and 12. This is expected as this range represents the natural boundary between healthy and positively diagnosed individuals.

Table 3 provides statistics on the performance of a binary classifier, including specificity, sensitivity, and area under the ROC curve ("AUC"). The models achieved an AUC of 0.828 for depression and 0.792 for anxiety.

TABLE 3

|  | ROC AUC | Specificity (at EER) | Sensitivity (at EER) |
|---|---|---|---|
| PHQ-8 | 0.828 | 0.755 | 0.755 |
| GAD-7 | 0.792 | 0.722 | 0.721 |

The performance of the models is best when the speaker either has both anxiety and depression, or neither. Both cases may be referred to as "consistent" sessions. The AUC for consistent sessions increases to 0.861 and 0.841 for PHQ-8 and GAD-7, respectively. The priors for consistent-only data change from around 0.20 to 0.16 for the positive class. This is not the case after rebalancing the data. The improved result remained—and even increased after rebalancing, to 0.863 and 0.849 for PHQ-8 and GAD-7, respectively. This finding suggests that class discrimination is better for joint modeling of depression and anxiety than for individual modeling of either condition.

The trained models may predict depression more accurately than anxiety because the models use certain word sequences and their dependencies as cues to separate positive from negative cases for each condition. To investigate, we gated word sequences in a forward direction to estimate the amount of prediction information available at a given time during a test session. For example, in a session with 800 words, we generated 800 cumulative gated samples by adding one word at a time, starting from the first word. For the 3078 test sessions, we generated roughly 2.4 million predictions. Based on these predictions, we calculated a value we refer to as "Within-Session Model Variability." This process was performed separately for each condition. In both cases, the models were optimized for AUC on the test set, and the test set is identical for both models.

Table 4 provides results for this measure of variability for the depression model. The variability within a session is highest for +,+ (i.e., both conditions present), lowest for −,− (i.e., neither condition present), and in between for the mixed cases. This suggests that that a model tuned for maximum AUC on binary depression classification is using word sequence cues associated with higher variability on this measure within a session.

TABLE 4

| W-S Model Variability | depression+ | depression− |
|---|---|---|
| anxiety+ | 0.09 | 0.088 |
| anxiety− | 0.084 | 0.077 |

Table 5 provides results for this measure of variability for the anxiety model. Here, however, (1) overall variability is lower than that for depression, and (2) variability for the −,− case is much lower than expected given the other three values. Because the same test data is used for both tables, and the NLP model methods are the same, this suggests that the word sequence cues for anxiety may be weaker or less prevalent, than those for depression.

TABLE 5

| W-S Model Variability | depression+ | depression− |
|---|---|---|
| anxiety+ | 0.077 | 0.065 |
| anxiety− | 0.061 | 0.048 |

Figure 14:
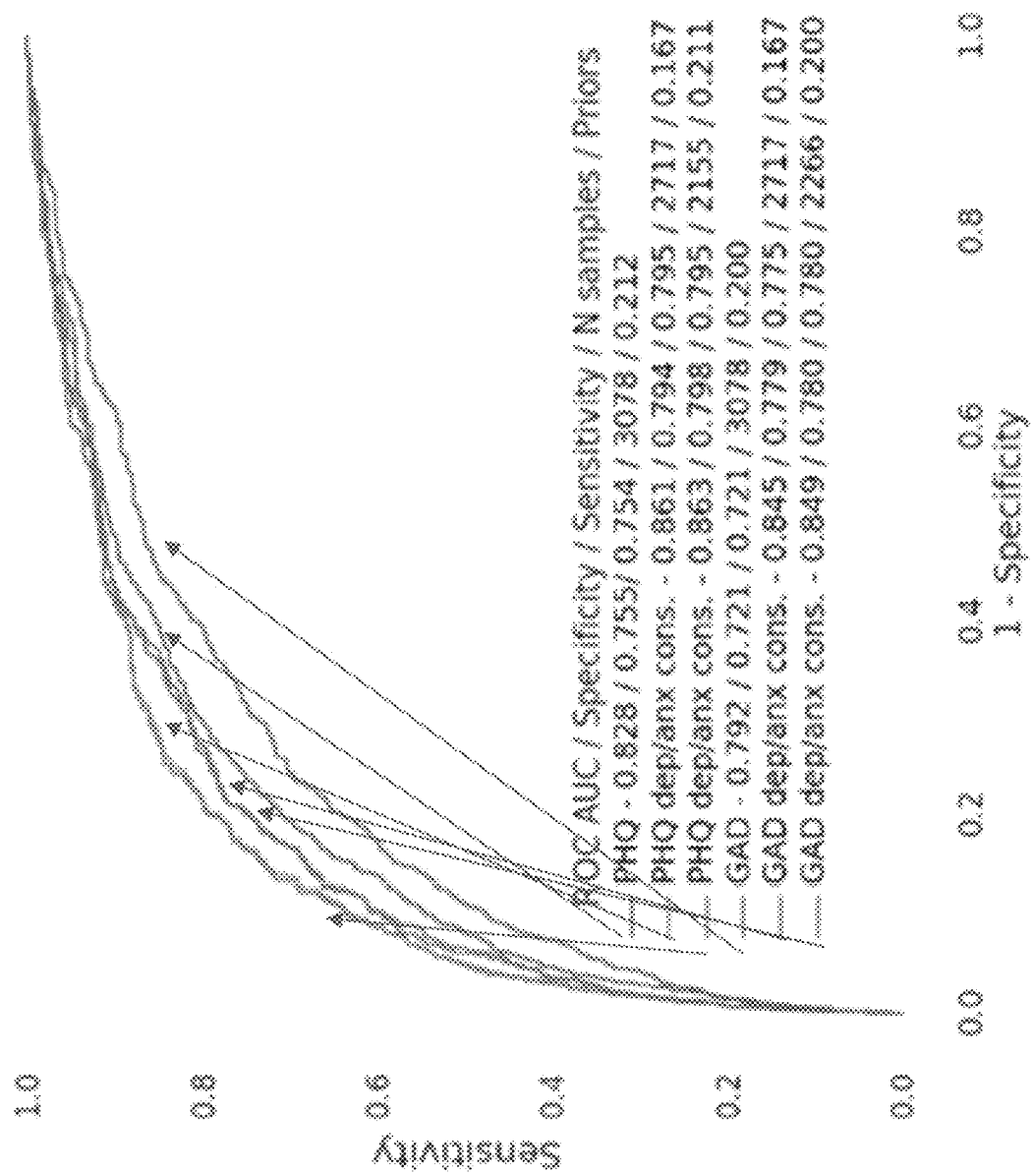
FIG. 14 is a chart that shows the ROCs of various trained models.

FIG. 14 show various AUCs of the models, including AUCs for the full test data sets, consistent sessions only (i.e., sessions in which PHQ-8 and GAD-7 sessions were consistent), and consistent sessions in which the data was rebalanced.

NLP Example 2

In a second example, we used the same approximately 16,000 sessions of speech, the age of each speaker, and corresponding PHQ-8 depression labels. Table 6 provides statistics for both the training data and test data, with training data in italics. "GP" indicates a general population corpus, and "SP" indicates a senior population corpus. "Depression+/−" indicates subjects with two or more sessions who inconsistently responded to PHQ-8 (i.e., by scoring both above 10 and below 10 in separate sessions).

TABLE 6

|  | GP | | SP | |
|---|---|---|---|---|
|  | Sessions | Subjects | Sessions | Subjects |
| dep+ | 653 | 653 | 208 | 39 |
|  | 2,563 | 1,836 | | |
| dep− | 2,425 | 2,425 | 479 | 80 |
|  | 8,100 | 5,483 | | |
| dep+/− | 2,209 | 526 | | 42 |
| Total | 3,078 | 3,078 | 687 | 161 |
|  | 12,872 | 7,845 | | |

|  | GP Sessions | SP Sessions |
|---|---|---|
| Words Length | ~800 | ~450 |
| Response No | 5.2 | 6.1 |

Figure 15:
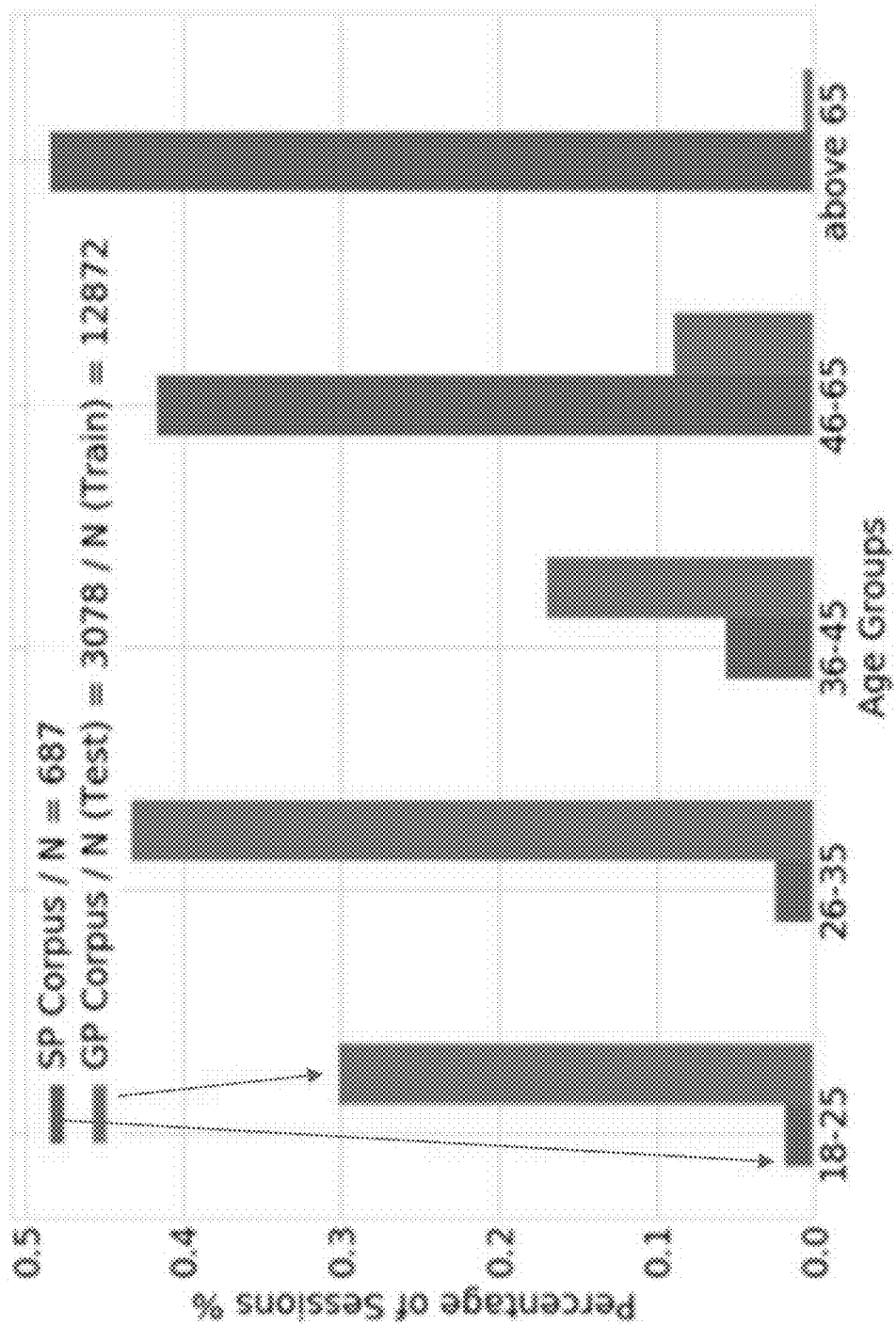
FIG. 15 is bar chart that shows age distributions in two corpora of data.

The main difference between the GP corpus and SP corpus is the age distribution. The age distributions of the two corpora are depicted in FIG. 15. The ages of the subjects in the GP corpus and the SP corpus are non-overlapping, with 67% of the subjects in the SP corpus over the age of 60. There are additional differences between two corpora. When subjects in the SP corpus returned short answers, they were asked an additional question. On the other hand, the subjects in the GP corpus were limited to between 4 and 6 questions. The collection time for subjects in the SP corpus was limited to 5 minutes, after which the session ended. Most of the subjects were also expected to repeat the process 5 times, at a frequency of once a week. On the other hand, subjects in GP corpus who completed more than one session waited at least three months between sessions, and within a single session, they were not a subject to a structured schedule.

We collected the SP corpus in Southern California. Sessions in the SP corpus are shorter, on average, than sessions in the GP corpus, with an average of 450 words per session for the SP corpus and 800 words per session for the GP corpus. The average number of responses per session in the SP corpus was also higher (6.1) than the average number of responses in the GP corpus. Given the size of the SP corpus, it is used only for test data in this example. The gender distribution between the GP corpus and the SP corpus is similar, with 62% of the subjects in the SP corpus being female, and 58% of the subjects in the GP corpus being female.

Figure 16:
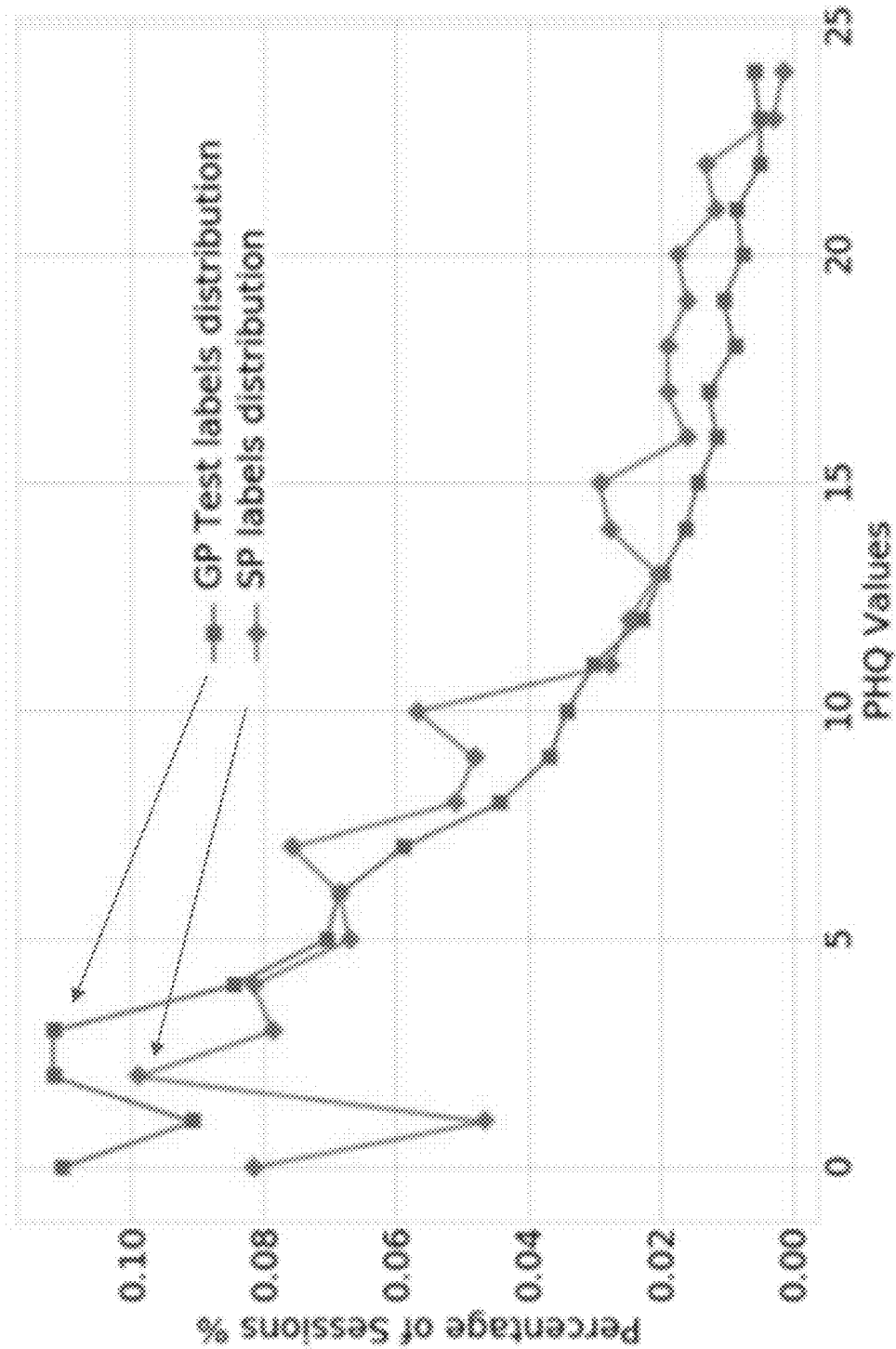
FIG. 16 is a chart that shows the distribution of PHQ-8 scores for the two corpora of data from FIG. 15.

FIG. 16 is a chart that shows the distribution of PHQ-8 scores for the two corpora. The distributions are similar, particularly for higher PHQ-8 scores. The prevalence of depression is 30% in the SP corpus and 26.7% in the GP corpus.

In this example, a classifier was trained on a GP training corpus only according to operation 1015 of FIG. 10. Table 7 provides performance statistics for the model described herein and the AVEC 2019 model described in F. Ringeval et al., *AVEC* 2019 *Workshop and Challenge: State-of-Mind, Detecting Depression with AI, and Cross-Cultural Affect Recognition,* 2019, https://arxiv.org/pdf/1907.11510.pdf, which is incorporated herein by reference and reproduced in Appendix A. RMSE is an error metric that is inversely correlated with performance and CCC is a correlation metric that is positively correlated with performance. The model described herein had both a lower RMSE and a higher CCC than the AVEC model when test on the GP corpus.

TABLE 7

|  | Regression RMSE | Regression CCC | Classification ROC AUC |
|---|---|---|---|
| AVEC Test | 6.37 | 0.111 |  |
| GP Test | 4.241 | 0.551 | 0.828 |
| SP Test |  |  | 0.761 |

Figure 17:
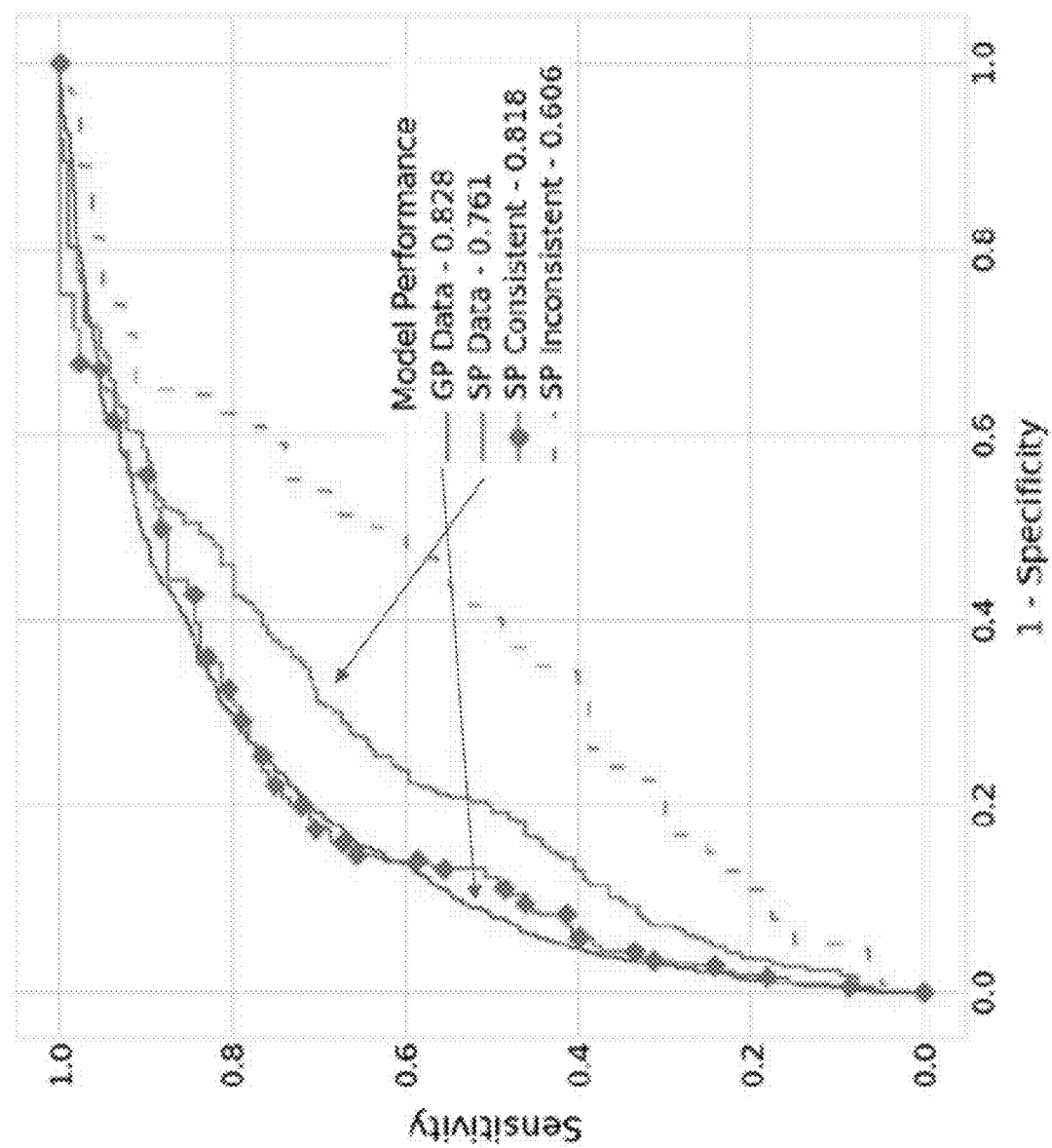
FIG. 17 is a chart that shows binary classification results for a trained model.

FIG. 17 is a chart that shows binary classification results for the model described herein for both a GP test corpus and an SP test corpus. The AUC for the GP corpus was 0.828, while the AUC for the SP corpus was 0.761. Given the differences in the corpora, including the major age distribution differences, the trained model was unexpectedly portable. In the SP test corpus, patients participated in a longitudinal study as described above. Classification performance of the GP-trained model depends strongly on consistency of a patient's self-reported PHQ-8 scores over the multiple-session collection. Out of the 161 unique patients in the SP corpus, 119 had PHQ-8 scores that were either always depression- or always depression+("SP Consistent") over their multiple sessions. The remaining 42 patients had inconsistent PHQ-8 results ("SP Inconsistent") over their multiple sessions. Overall, consistently reporting patients tended to be more concise and give fewer responses than those who were inconsistent. FIG. 17 shows that there is a marked difference in model performance as a function of user consistency, even though sessions were performed one at a time and subjects had no knowledge of their own scores. The AUC of the model for the SP corpus is 0.82 for consistent patients and 0.61 for inconsistent patients. Despite the large mismatch in age and other factors in the two corpora, the model performed as well for consistent users in the SP corpus as for the GP corpus. This data shows good portability, especially for consistent patients.

Table 8 provides statistics on model performance by age group. The number of subjects under the age of 50 in the SP corpus is small by design. Performance of the model on the GP test corpus is heavily correlated to that of the age distribution of the GP training corpus. The same is true for the SP test corpus, although very low data samples affect the robustness of the results.

TABLE 8

|  | GP size | SP size | AUC GP | AUC SP |
|---|---|---|---|---|
| 18-25 | 853 | 12 | 0.829 | 1 |
| 26-35 | 1393 | 17 | 0.825 | 0.984 |
| 36-45 | 514 | 41 | 0.82 | 0.796 |
| 46-65 | 288 | 289 | 0.813 | 0.782 |
| above 65 | 23 | 328 | 0.733 | 0.688 |

Figure 18:
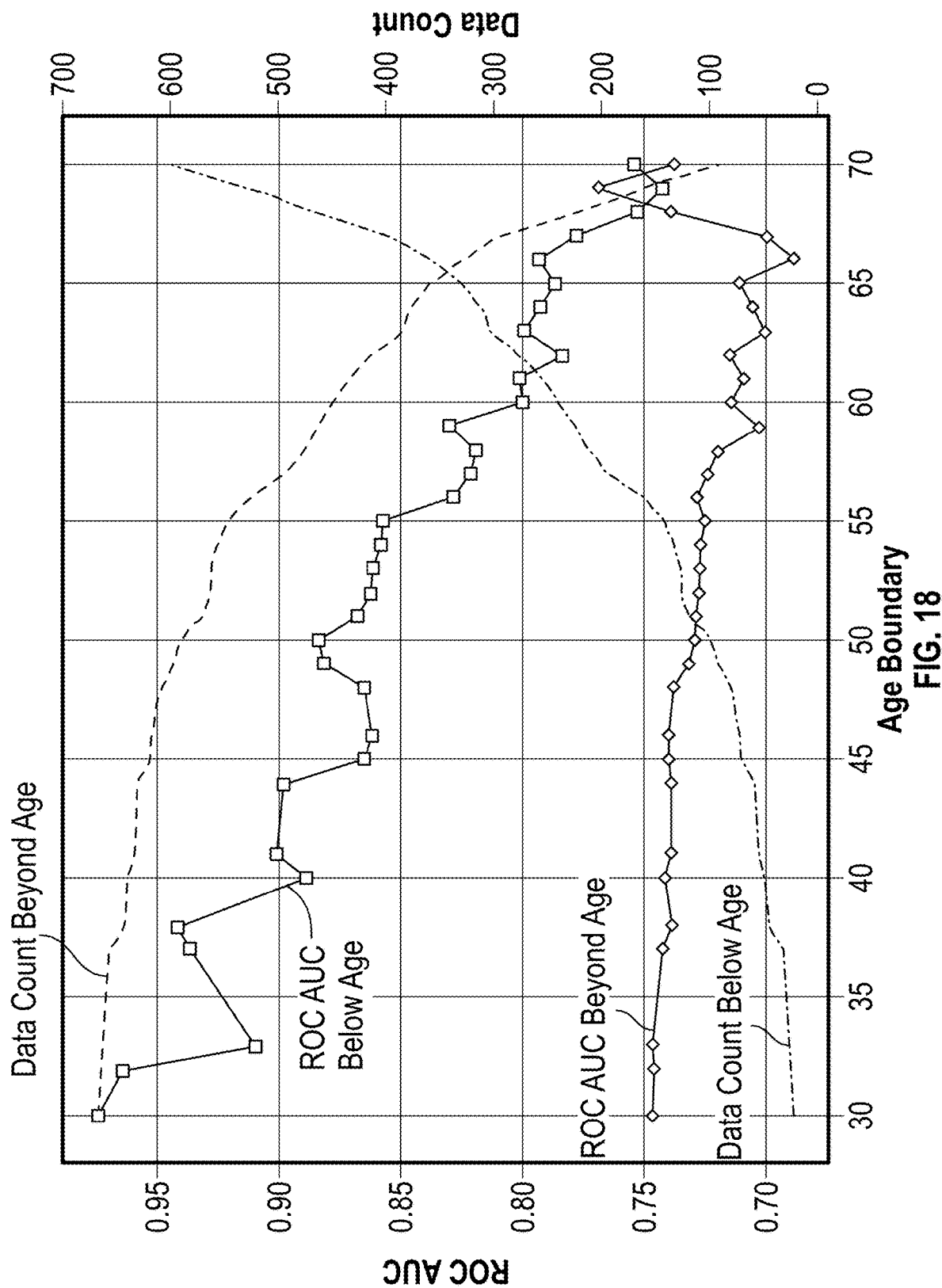
FIG. 18 is a chart that shows data counts for each age bucket and the ROC for each age bucket.

For the SP test corpus, we also examined performance by actual age. For each age threshold (e.g., 30, 35, 40, 45, etc.) we combined all subjects below that threshold and all subjects above ("beyond") that threshold. FIG. 18 is a chart that depicts data counts for each age bucket (solid lines) and the AUC for each age bucket. FIG. 18 shows that model performance degrades as the age threshold increase, i.e., as more and more older subjects are added to a bucket. Model performance also degrades slightly as younger subjects are removed from a bucket.

Table 9 provides statistics on model performance by age group.

TABLE 9

|  | GP | | | | SP | | | |
|---|---|---|---|---|---|---|---|---|
|  | Size | AUC | Specificity | Sensitivity | Size | AUC | Specificity | Sensitivity |
| Female | 1799 | 0.827 | 0.76 | 0.76 | 433 | 0.784 | 0.711 | 0.71 |
| Male | 1238 | 0.825 | 0.744 | 0.783 | 254 | 0.752 | 0.691 | 0.695 |

Table 10 provides statistics on model performance by ethnicity. The model performed less well for Hispanic subjects as compared to other groups. This is a case in which we could train a model specifically for this population by assigning a higher weight in training to samples from the population. For many but not all subgroups, a one size fits all model performs well. For some subgroups more attention may need to be paid to creating a tailored model for that subgroup using the same invention but weighing or including mainly data from that group in training.

TABLE 10

| Ethnicity | Size | ROC AUC | Specificity EER | Sensitivity EER |
|---|---|---|---|---|
| Caucasian | 2047 | 0.829 | 0.752 | 0.757 |
| Hispanic | 246 | 0.788 | 0.737 | 0.730 |
| African | 244 | 0.815 | 0.625 | 0.707 |
| Mixed | 170 | 0.856 | 0.778 | 0.770 |
| East Asian | 125 | 0.819 | 0.752 | 0.750 |
| Other | 89 | 0.816 | 0.718 | 0.666 |
| South Asian | 58 | 0.892 | 0.680 | 0.750 |
| Caribbean | 37 | 0.800 | 0.533 | 0.714 |
| Decline | 25 | 0.847 | 0.695 | 0.500 |

Additional Data

Figure 20:
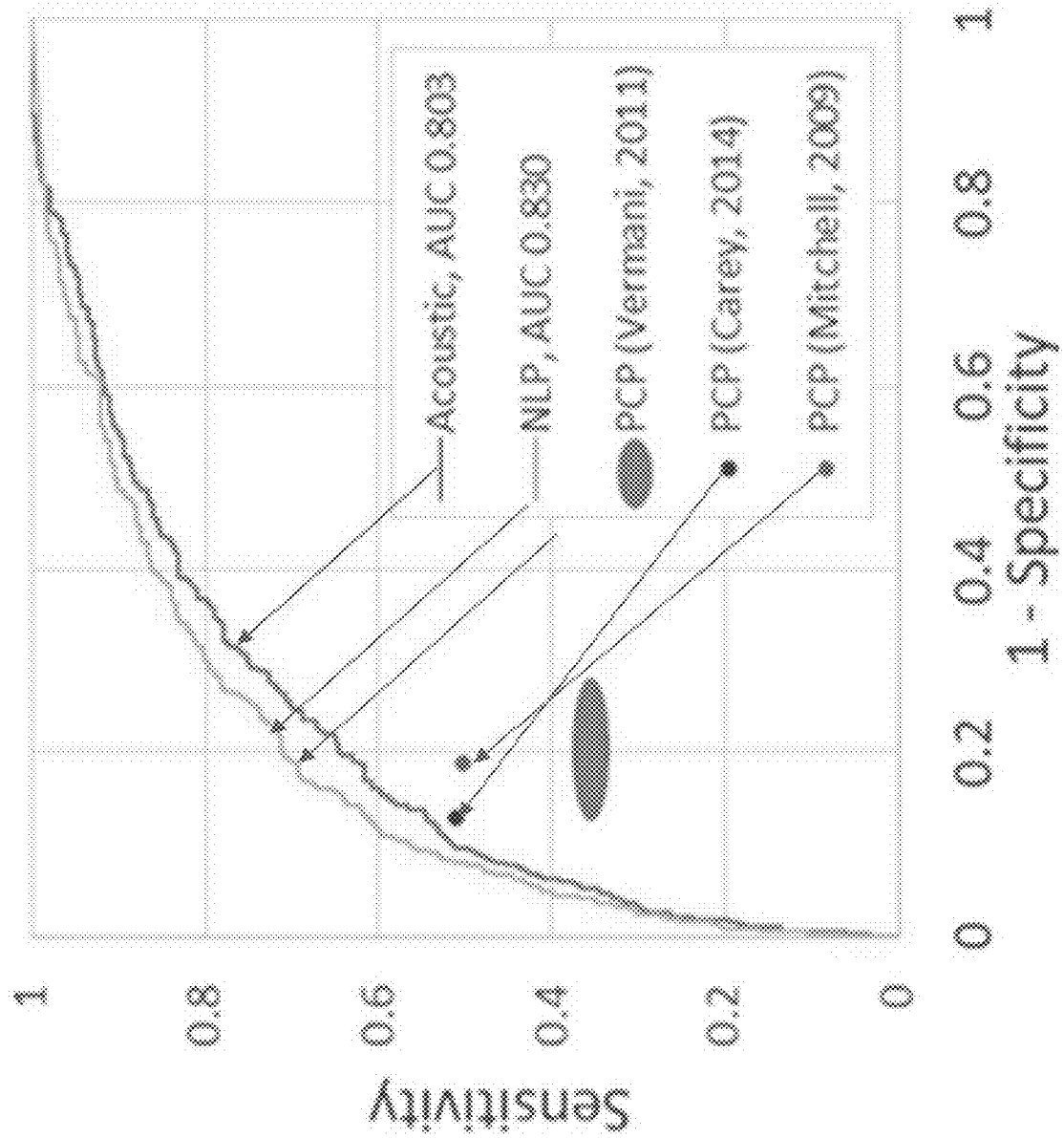
FIG. 20 is a chart that shows performance data for an acoustic model and an NLP model.

FIG. 20 and Table 11 show additional performance data for both the acoustic model and the NLP model in making a binary depression prediction when trained and tested on the same speech data used in NLP Examples 1 and 2.

Model Performance by Test Subset

TABLE 11

|  |  |  | Metadata Categories | | | | |
| --- | --- | --- | --- | --- | --- | --- | --- |
|  |  |  | Train set Sess. Count | Test set Sess. Count | Depression Rate | Mean PHQ | Acous. AUC | NLP AUC |
| Base performance over all test set | | | 11215 | 3080 | 25.7% | 5.93 | 0.779 | 0.825 |
| User Metadata | Gender | Male | 3125 | 1244 | 20.4% | 5.74 | 0.769 | 0.819 |
|  |  | Female | 4419 | 1790 | 35.3% | 6.77 | 0.774 | 0.820 |
|  | Age Group | 18-25 | 2087 | 847 | 30.0% | 7.32 | 0.792 | 0.828 |
|  |  | 26-35 | 3256 | 1382 | 24.8% | 6.4 | 0.752* | 0.820 |
|  |  | 36-45 | 1444 | 513 | 18.7% | 5.6 | 0.790 | 0.808 |
|  |  | 46-65 | 766 | 283 | 34.6% | 4.78 | 0.792 | 0.819 |
|  | Smoking | Non-smoker | 3850 | 813 | 23.2% | 6.44 | 0.803 | 0.836 |
|  |  | Smoker | 1807 | 397 | 31.3% | 7.47 | 0.767 | 0.808 |
|  | US states (selected) | California | 924 | 266 | 26.8% | 6.68 | 0.741 | 0.830 |
|  |  | Florida | 831 | 253 | 26.2% | 6.41 | 0.842* | 0.875* |
|  |  | Texas | 723 | 232 | 26.0% | 6.66 | 0.810 | 0.845 |
|  |  | New York | 596 | 142 | 25.7% | 6.70 | 0.815 | 0.887 |
|  | Ethnicity | Caucasian | 5219 | 2039 | 24.7% | 6.05 | 0.796 | 0.826 |
|  |  | African American | 569 | 241 | 19.7% | 5.63 | 0.777 | 0.812 |
|  |  | Hispanic | 552 | 248 | 25.0% | 6.73 | 0.676* | 0.788 |
|  |  | Asian American | 452 | 185 | 20.0% | 5.61 | 0.789 | 0.841 |
|  |  | Mixed | 364 | 173 | 31.3% | 7.22 | 0.768 | 0.827 |
|  | Marital | Never married | 1850 | 188 | 31.5% | 7.84 | 0.778 | 0.857 |
|  |  | Married | 1220 | 173 | 21.2% | 5.20 | 0.774 | 0.829 |
| Session Metadata | Time of Day[2] | Morning | 1275 | 476 | 24.3% | 6.39 | 0.785 | 0.823 |
|  |  | Afternoon | 3471 | 1127 | 22.7% | 6.08 | 0.776 | 0.841 |
|  |  | Night | 4012 | 1005 | 26.3% | 6.76 | 0.783 | 0.815 |
|  |  | Late Night | 2457 | 472 | 31.2% | 7.26 | 0.758 | 0.804 |
|  | Day of week | Weekdays | 9343 | 2307 | 25.2% | 6.54 | 0.782 | 0.832 |
|  |  | Weekends | 1872 | 773 | 27.5% | 6.88 | 0.772 | 0.802 |
|  | Time of year[1] | Summer | 993 | 756 | 20.1% | 5.39 | 0.818 | 0.838 |
|  |  | Rest of the year | 6056 | 2324 | 27.0% | 6.88 | 0.769 | 0.821 |

Table 11 shows that the acoustic model and the NLP model both achieve an AUC that is close to or above 0.80. Model fusion gives an additional 2-3% in AUC performance. These systems use no information other than the speech sample itself. That is, no metadata, patient history, or other information (such as visual information) is used for the acoustic and NLP results. The NLP model performs better overall than the acoustic system, but both systems show strong results in line with, or better than the primary care provider (PCP) reference studies, as shown in FIG. 20. However, comparisons to the PCP studies are indirect because the set-up and data are different.

Composite Models

Figure 6:
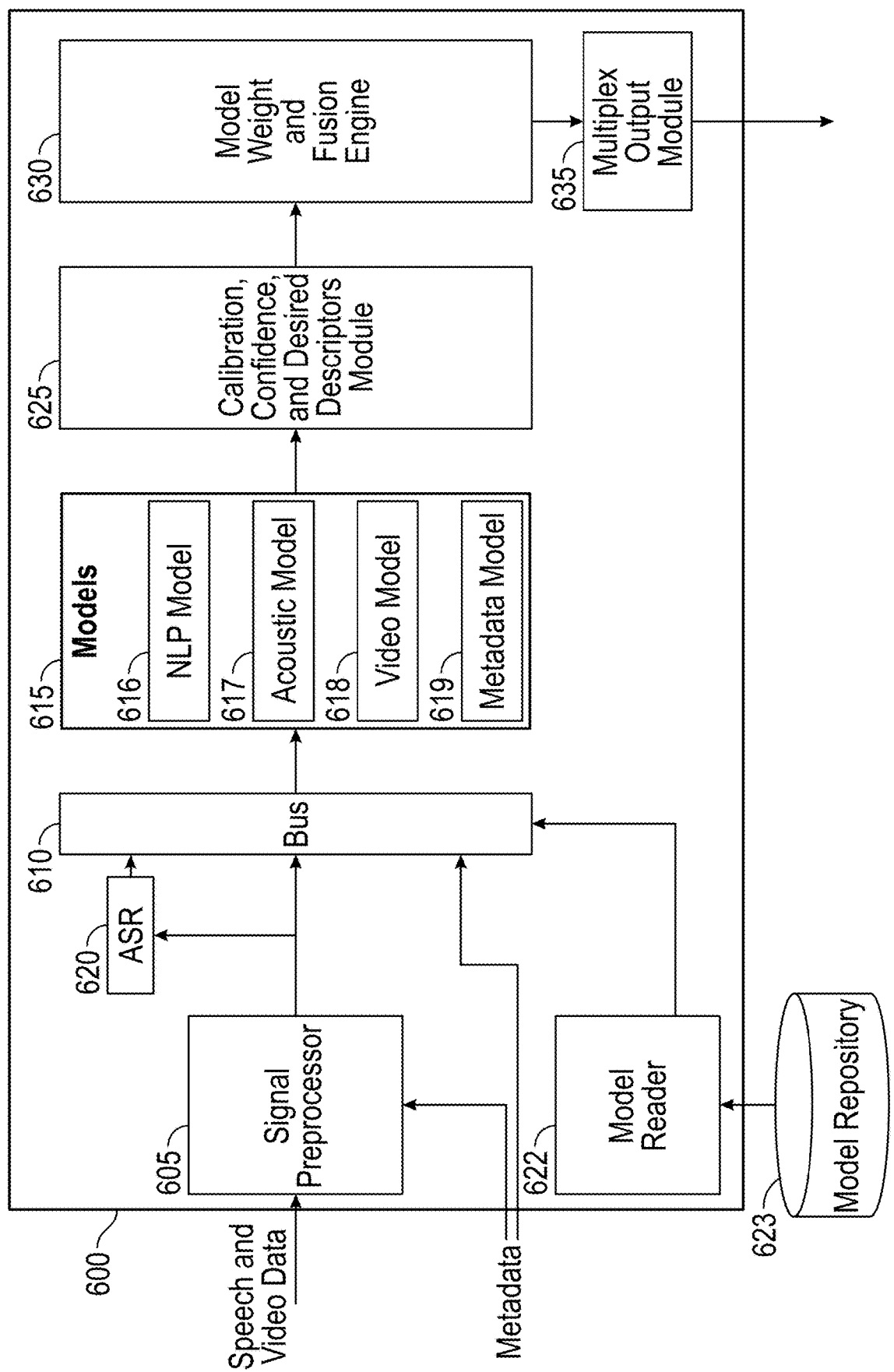
FIG. 6 schematically illustrates a system that is configured to assess, screen, predict, or monitor the behavioral or mental health state of a subject using speech data, video data, and/or metadata about the subject.

FIG. 6 schematically illustrates a system 600 that is configured to assess, screen, predict, or monitor the behavioral or mental health state of a subject using speech data, video data, and/or metadata about the subject. The system 100 of FIG. 1 may be a component part of the system 600. For example, the system 100 may be used as the acoustic model 617 of the system 600. The system of FIG. 9 may also be a component part of the system 600. For example, the system 900 may be used as the NLP model 616 of the system 600.

The system 600 may have a signal preprocessor 605 that can preprocess speech and video data from the subject. For example, the signal preprocessor 605 can segment and reduce noise in the speech data or perform beamforming, acoustic echo cancellation, echo suppression, dereverberation, or even noise injection. The signal preprocessor 605 can also generate audio and video quality confidence values. The audio and video quality confidence values may take into account the quality of the respective audio and video signals and the length of the audio and video samples, for example.

Additionally, the signal preprocessor 605 can append metadata to the speech and video data. This data may be supplied in such preprocessed form to a bus 610 for consumption by the models 615, and it may also be subjected to a third-party or custom ASR system 620. The ASR system 620 can generate a machine-readable transcription of the input speech and a transcription confidence. Like the signal preprocessor 605, the ASR system 620 can supply its outputs to the bus 610 for later consumption by other components.

A model reader 622 may access the models 615 from a model repository 623. The models 615 may include a natural language processing model 616, an acoustic model 617, a video model 618, and a metadata model 619. The natural language processing model 616 can consider the lexical content of the input speech from the subject. The acoustic model 617 may consider the non-lexical content of the input speech. The acoustic model 617 may be, for example, the system 100 of FIG. 1. The video model 618 may consider video of the subject's facial expressions, for example. And the metadata model 619 may consider other factors about the subject, such as the subject's age, race, ethnicity, sex, gender, income, education, location, medical history, or the like. The models 615 can consume the preprocessed input data from the bus 610 to assess, screen, predict, or monitor the subject's behavioral or mental health state. Each model can generate a separate output. However, the models may be interdependent. That is, one model may consume the output of another model to generate its own output.

The output of each model may be provided to a calibration, confidence, and desired descriptors module 625. This module 625 can calibrate the outputs of the models to produce scaled scores and generate confidence measures for the scores. The module 625 can assign human-readable labels to the scores. The module 625 can provide its output to a model weight and fusion engine 630. The engine 630 can combine the model outputs into a consolidated classification of the behavioral or mental health state of the subject from which the input data originated. The engine 630 can apply static weights to the models 615. Alternatively, the weights may be dynamic. For example, weights for a given model output may, in some embodiments, be modified based upon the confidence level of the classification by the model. For example, if the NLP model 616 classifies an individual as being not depressed, with a confidence of 0.56, but the acoustic model 617 renders a depressed classification with a confidence of 0.97, the engine 630 may apply a larger weight to the acoustic model 617.

In some cases, the weight of a given model may be linearly scaled by its confidence level, multiplied by a base weight for the model. In some other cases, model output weights may be temporally based. For example, the engine 630 may assign a greater weight to the generally the NLP model 6161 when the subject is speaking, but a greater weight to the video model 618 when the subject is not speaking. Similarly, if the acoustic model 617 and the video model 618 suggest that the subject is being untruthful (e.g., due to frequent gaze shifting, pitch modulation, or increased speech rate), then the engine 630 may apply a lower weight of the NLP model 616.

The engine 630 can provide its fused and weighted output to a multiplex output module 635, which can combine the fused and weighted output with other information to generate a final result, e.g., a prediction of the subject's behavioral or mental health state.

Fusion can consider not only the model inputs but a range of information that differentially affects the models. Examples of information that differentially affect the models include condition prevalence, the distribution of label values (patterns of data skew), metadata, sample length, sample data quality, and so on.

The system 600 can be used in conjunction with an automated query module that presents a query or a sequence of queries to a subject over a single session or over multiple different sessions. The automated query module can present and/or formulate the queries based in part on one or more target mental states to be assessed. The queries can be configured to elicit at least one response from the subject. The automated query module can transmit the queries in an audio, visual, or textual format to the subject to elicit the at least one response. The automated query module can receive data comprising the at least one response from the subject. The data can include speech and video data from the subject. The system 600 can generate, for the single session, for each of the multiple different sessions, or upon completion of one or more sessions of the multiple different sessions, one or more assessments of the mental state associated with the subject using the speech data, video data, and metadata about the subject.

When compared to conventional screening tools such as Patient Health Questionnaire 9 ("PHQ-9"), which is designed to screen patients for depression, the system 600 may be more engaging, which may result in higher levels of adoption. The system 600 (e.g., a composite acoustic and NLP model) may have a specificity of at least about 60%, 65%, 70%, 80%, 85%, 90%, 95%, or more. The system 600 may have a sensitivity of at least about 60%, 65%, 70%, 80%, 85%, 90%, 95%, or more. The system 600 may have an area-under-the-curve (AUC) of at least about 60%, 65%, 70%, 80%, 85%, 90%, 95%, or more. The system may provide a relative performance (e.g., sensitivity, specificity, or AUC) improvement of at least about 1%, 2%, 3%, 4%, 5%, 10%, 15%, 20%, 25%, or more over prior systems.

The system 600 may also encourage more truthful and complete responses from subjects as compared to a written questionnaire like PHQ-9. Similar systems are described in PCT/US2019/037953, which is entirely incorporated herein by reference.

Longitudinal Modeling

The systems described herein can be used to track a patient's progress over time, which may be referred to as longitudinal analysis. In longitudinal analysis, input speech from a current session can be supplemented with input speech from one or more past sessions to generate a prediction. The current and past speech data can be represented as vectors in a response matrix. The model can generate a prediction for each vector in the matrix. A longitudinal handler can look for any correlation between the past speech data and the current data. This may help to return more accurate predictions on the current data. Longitudinal analysis may take into account factors such as time of day, day of week, month of year, weather at location, and the like that may affect the priors for many behavioral health conditions. Models can be trained with this information for better prediction performance.

System Outputs

The system 600 of FIG. 6 can output an electronic report identifying whether a patient is at risk of a mental or physiological condition. The electronic report can be configured to be displayed on a graphical user interface of a user's electronic device. The user may be the patient himself or the patient's health care provider. The electronic report can include a quantification of the risk of the mental or physiological condition, e.g., a normalized score. The score can be normalized with respect the entire population or with respect to a sub-population of interest. The electronic report can also include a confidence level of the normalized score. The confidence level can indicate the reliability of the normalized score (i.e., the degree to which the normalized score can be trusted).

The electronic report can include visual graphical elements. For example, if the patient has multiple scores from multiple screening or monitoring sessions that occurred at several different times, the visual graphical element may be a graph that shows the progression of the patient's scores over time.

The system 600 can output the electronic report to the patient or a contact person associated with the patient, a healthcare provider, a healthcare payer, or another third-party. The system 600 can output the electronic report substantially in real-time, even while the screening, monitoring, or diagnosis is ongoing. In response to a change in the normalized score or confidence during the course of the screening, monitoring, or diagnosis, the electronic report can be updated substantially in real-time and be re-transmitted to the user.

In some cases, the electronic report may include one or more descriptors about the patient's mental state. The descriptors can be a qualitative measure of the patient's mental state (e.g., "mild depression"). Alternatively or additionally, the descriptors can be topics that the patient mentioned during the screening. The descriptors can be displayed in a graphic, e.g., a word cloud.

The models described herein may be optimized for a particular purpose or based on the entity that may receive the output of the system. For example, the models may be optimized for sensitivity in estimating whether a patient has a mental condition. Healthcare payers such as insurance companies may prefer such models so that they can minimize the number of insurance payments made to patients with false positive diagnoses. In other cases, the models may be optimized for specificity in estimating whether a patient has a mental condition. Healthcare providers may prefer such models. The system may select the appropriate model based on the stakeholder to which the output will be transmitted. After processing, the system can transmit the output to the stakeholder.

The models described herein can alternatively be tuned or configured to process speech and other data according to a desired level of sensitivity or a desired level of specificity determined by a clinician, healthcare provider, insurance company, or government regulated body. Alternatively or additionally, the models can be tuned, configured, or trained to optimize precision, recall, F1, equal error rate ("EER"), positive predictive value ("PPV"), negative predictive value ("NPV"), likelihood ratio positive ("LR+"), likelihood ratio negative ("LR−"), concordance correlation coefficient ("CCC"), Pearson correlation coefficient ("PCC"), root mean squared error ("RMSE"), mean absolute error ("MAE"), or any other relevant performance metric.

The electronic report may include a "word cloud" or "topic cloud" extracted from a text transcript of the patient's speech. A word cloud may be a visual representation of individual words or phrases, with words and phrases used most frequently designated using larger font sizes, different colors, different fonts, different typefaces, or any combination thereof. Depicting word or phrase frequency in such a way may be helpful as depressed patients commonly say particular words or phrases with larger frequencies than non-depressed patients. For example, depressed patients may use words or phrases that indicate dark, black, or morbid humor. They may talk about feeling worthless or feeling like failures, or use absolutist language, such as "always", "never", or "completely." Depressed patients may also use a higher frequency of first-person singular pronouns (e.g., "I", "me") and a lower frequency of second- or third-person pronouns when compared to the general population. The system may be able to train a machine learning algorithm to perform semantic analysis of word clouds of depressed and non-depressed people, in order to be able to classify people as depressed or not depressed based on their word clouds. Word cloud analysis may also be performed using unsupervised learning. For example, the system may analyze unlabeled word clouds and search for patterns, in order to separate people into groups based on their mental states. The generated words may indicate a decreased or increased risk of depression (i.e., that are associated with an increased or decreased risk of depression).

Similarly, the electronic report may include predicted personality traits of the patient. Personality traits (e.g., introversion or extroversion) can be inferred from speech length.

The electronic report may additionally include evidence-based psychoeducation materials and support strategies. The materials and support strategies may be tailored to the patient's score. The materials and support strategies may be provided directly to the patient in the form of videos, text, and assignments, or the materials and support strategies may be provided to the patient's health care provider, who can lead the psychoeducation process.

Use Cases

The acoustic and NLP models described herein may be used to monitor teenagers for depression. The models may perform machine learning analysis on groups of teenagers in order to determine voice-based biomarkers that may uniquely classify teenagers as being at risk for depression. Depression in teenagers may have different causes than in adults. Hormonal changes may also introduce behaviors in teenagers that would be atypical for adults. A system for screening or monitoring teenagers would need to employ a model tuned to recognize these unique behaviors. For example, depressed or upset teenagers may be more prone to anger and irritability than adults, who may withdraw when upset. Thus, questions from assessments may elicit different voice-based biomarkers from teenagers than adults. Different screening or monitoring methods may be employed when testing teenagers for depression or studying teenagers' mental states than are employed for screening or monitoring adults. Clinicians may modify assessments to particularly elicit voice-based biomarkers specific to depression in teenagers. The system may be trained using these assessments and determine a teenager-specific model for predicting mental states. Teenagers may further be segmented by household (foster care, adoptive parent(s), two biological parents, one biological parent, care by guardian/relative, etc.), medical history, gender, age and socioeconomic status, and these segments may be incorporated into the model's predictions.

The models described herein may also be used to monitor the elderly for depression and dementia. The elderly may also have particular voice-based biomarkers that younger adults may not have. For example, the elderly may have strained or thin voices, owing to aging. Elderly people may exhibit aphasia or dysarthria, have trouble understanding survey questions, follow-ups, or conversational speech, and may use repetitive language. Clinicians may develop, or algorithms may be used to develop, surveys for eliciting particular voice-based biomarkers from elderly patients. Machine learning algorithms may be developed to predict mental states in elderly patients, specifically, by segmenting patients by age. Differences may be present in elderly patients from different generations, who may have different views on gender roles, morality, and cultural norms. Models may be trained to incorporate elder age brackets, gender, race, socioeconomic status, physical medical conditions, and family involvement.

The system may be used to test airline pilots for mental fitness. Airline pilots have taxing jobs and may experience large amounts of stress and fatigue on long flights. Clinicians or algorithms may be used to develop screening or monitoring methods for these conditions. For example, the system may base an assessment off of queries similar to those tested in the Minnesota Multiphasic Personality Inventory (MMPI) and MMPI-2.

The system may also be used to screen military personnel for mental fitness. For example, the system may implement an assessment that uses queries with similar subject matter to those asked on the Primary Care Post-Traumatic Stress Disorder for Diagnostic and Statistical Manual of Mental Disorders (DSM)-5 (PC-PTSD-5) to test for PTSD. In addition to PTSD, the system may screen military personnel for depression, panic disorder, phobic disorder, anxiety, and hostility. The system may employ different surveys to screen military personnel pre-and post-deployment. The system may segment military personnel by segmenting for occupation, and segment military personnel by branch, officer or enlisted, gender, age, ethnicity, number of tours/deployments, marital status, medical history, and other factors.

The system may be used to evaluate prospective gun buyers, e.g., by implementing background checks. Assessments may be designed, by clinicians or algorithmically, to evaluate prospective buyers for mental fitness for owning a firearm. The survey may have a requirement to determine, using questions and follow-up questions, if a prospective gun buyer would be able to be certified as a danger to him or herself or others, by a court or other authority.

Scoring

The models described herein may produce scores at various stages of a mental or behavioral health assessment. The scores produced may be scaled scores or binary scores. Scaled scores may range over a large number of values, while binary scores may be one of two discrete values. The models may interchange binary and scaled scores at various stages of the assessment, to monitor different mental states, or update particular binary scores and particular scaled scores for particular mental states over the course of an assessment.

The scores produced by the system, either binary or scaled, may be produced after each response to each query in the assessment, or may be formulated in part based on previous queries. In the latter case, each marginal score acts to fine-tune a prediction of depression, or of another mental state, as well as to make the prediction more robust. Marginal predictions may increase confidence measures for predictions of mental states in this way, after a particular number of queries and responses (correlated with a particular intermediate mental state)

For scaled scores, the refinement of the score may allow clinicians to determine, with greater precision, severities of one or more mental states the patient is experiencing. For example, the refinement of the scaled score, when observing multiple intermediate depression states, may allow a clinician to determine whether the patient has mild, moderate, or severe depression. Performing multiple scoring iterations may also assist clinicians and administrators in removing false negatives, by adding redundancy and adding robustness. For example, initial mental state predictions may be noisier, because relatively fewer speech segments are available to analyze, and NLP algorithms may not have enough information to determine semantic context for the patient's recorded speech. Even though a single marginal prediction may itself be a noisy estimate, refining the prediction by adding more measurements may reduce the overall variance in the system, yielding a more precise prediction. The predictions described herein may be more actionable than those which may be obtained by simply administering a survey, as people may have incentive to lie about their conditions. Administering a survey may yield high numbers of false positive and false negative results, enabling patients who need treatment to slip through the cracks. In addition, although trained clinicians may notice voice and face-based biomarkers, they may not be able to analyze the large amount of data the models disclosed herein are able to analyze.

The scaled score may be used to describe a severity of a mental state. The scaled score may be, for example, a number between 1 and 5, or between 0 and 100, with larger numbers indicating a more severe or acute form of the patient's experienced mental state. The scaled score may include integers, percentages, or decimals. Conditions for which the scaled score may express severity may include, but are not limited to depression, anxiety, stress, PTSD, phobic disorder, schizophrenia, and panic disorder. In one example, a score of 0 on a depression-related aspect of an assessment may indicate no depression, a score of 50 may indicate moderate depression, and a score of 100 may indicate severe depression. The scaled score may be a composition of multiple scores. A mental state may be expressed as a composition of mental sub-states, and a patient's composite mental state may be a weighted average of individual scores from the mental sub-states. For example, a composition score of depression may be a weighted average of individual scores for anger, sadness, self-image, self-worth, stress, loneliness, isolation, and anxiety.

A scaled score may be produced using a model that uses a multilabel classifier. This classifier may be, for example, a decision tree classifier, a k-nearest neighbors classifier, or a neural network-based classifier. The classifier may produce multiple labels for a particular patient at an intermediate or final stage of assessment, with the labels indicating severities or extents of a particular mental state. For example, a multilabel classifier may output multiple numbers, which may be normalized into probabilities using a softmax layer. The label with the largest probability may indicate the severity of the mental state experienced by the patient.

The scaled score may also be determined using a regression model. The regression model may determine a fit from training examples that are expressed as sums of weighted variables. The fit may be used to extrapolate a score from a patient with known weights. The weights may be based in part on features, which may be in part derived from the audiovisual signal (e.g., voice-based biomarkers) and in part derived from patient information, such as patient demographics. Weights used to predict a final score or an intermediate score may be taken from previous intermediate scores.

The scaled score may be scaled based on a confidence measure. The confidence measure may be determined based on recording quality, type of model used to analyze the patient's speech from a recording (e.g., audio, visual, semantic), temporal analysis related to which model was used most heavily during a particular period of time, and the point in time of a specific voice-based biomarker within an audiovisual sample. Multiple confidence measures may be taken to determine intermediate scores. Confidence measures during an assessment may be averaged in order to determine a weighting for a particular scaled score.

The binary score may reflect a binary outcome from the system. For example, the system may classify a user as being either depressed or not depressed. The system may use a classification algorithm to do this, such as a neural network or an ensemble method. The binary classifier may output a number between 0 and 1. If a patient's score is above a threshold (e.g., 0.5), the patient may be classified as "depressed." If the patient's score is below the threshold, the patient may be classified as "not depressed." The system may produce multiple binary scores for multiple intermediate states of the assessment. The system may weight and sum the binary scores from intermediate sates of the assessment in order to produce an overall binary score for the assessment.

The outputs of the models described herein can be converted to a calibrated score, e.g., a score with a unit range. The outputs of the models described herein can additionally or alternatively be converted to a score with a clinical value. A score with a clinical value can be a qualitative diagnosis (e.g., high risk of severe of depression). A score with a clinical value can alternatively be a normalized, qualitative score that is normalized with respect to the general population or a specific sub-population of patients. The normalized, qualitative score may indicate a risk percentage relative to the general population or to the sub-population.

The systems described herein may be able to identify a mental state of a subject (e.g., a mental disorder or a behavioral disorder) with less error (e.g., 10% less) or a higher accuracy (e.g., 10% more) than a standardized mental health questionnaire or testing tool. The error rate or accuracy may be established relative to a benchmark standard usable by an entity for identifying or assessing one or more medical conditions comprising the mental state. The entity may be a clinician, a healthcare provider, an insurance company, or a government-regulated body. The benchmark standard may be a clinical diagnosis that has been independently verified.

Confidence Measures

The models described herein may use confidence measures. A confidence measure may be a measure of how effective the score produced by the machine learning algorithm may be in order of accurately predicting a mental state, such as depression. A confidence measure may depend on conditions under which the score was taken. A confidence measure may be expressed as a whole number, a decimal, or a percentage. Conditions may include a type of recording device, an ambient space in which signals were taken, background noise, patient speech idiosyncrasies, language fluency of a speaker, the length of responses of the patient, an evaluated truthfulness of the responses of the patient, and frequency of unintelligible words and phrases. Under conditions where the quality of the signal or speech makes it more difficult for the speech to be analyzed, the confidence measure may have a smaller value. In some embodiments, the confidence measure may be added to the score calculation, by weighting a calculated binary or scaled score with the confidence measure. In other embodiments, the confidence measure may be provided separately. For example, the system may tell a clinician that the patient has a 0.93 depression score with 75% confidence.

The confidence level may also be based on the quality of the labels of the training data used to train the models that analyze the patient's speech. For example, if the labels are based on surveys or questionnaires completed by patients rather than official clinical diagnoses, the quality of the labels may be determined to be lower, and the confidence level of the score may thus be lower. In some cases, it may be determined that the surveys or questionnaires have a certain level of untruthfulness. In such cases, the quality of the labels may be determined to be lower, and the confidence level of the score may thus be lower.

Various measures may be taken by the system in order to improve a confidence measure, especially where the confidence measure is affected by the environment in which the assessment takes place. For example, the system may employ one or more signal processing algorithms to filter out background noise or use impulse response measurements to determine how to remove effects of reverberations caused by objects and features of the environment in which the speech sample was recorded. The system may also use semantic analysis to find context clues to determine the identities of missing or unintelligible words.

In addition, the system may use user profiles to group people based on demeanor, ethnic background, gender, age, or other categories. Because people from similar groups may have similar voice-based biomarkers, the system may be able to predict depression with higher confidence, as people who exhibit similar voice-based biomarkers may indicate depression in similar manners.

For example, depressed people from different backgrounds may be variously categorized by slower speech, monotone pitch or low pitch variability, excessive pausing, vocal timbre (gravelly or hoarse voices), incoherent speech, rambling or loss of focus, terse responses, and stream-of-consciousness narratives. These voice-based biomarkers may belong to one or more segments of patients analyzed.

Clinical Scenarios

The models described herein may analyze speech from primary care health interactions. For example, the system may be used to augment inferences about a patient's mental health taken by a trained health provider individual. The system may also be used to evaluate mental health from a preliminary screening or monitoring call (e.g., a call made to a health care provider organization by a prospective patient for the purpose of setting up a medical appointment with a trained mental health professional). For a primary screen, the health care professional may ask specific questions to the patient in a particular order to ascertain mental health treatment needs of the patient. A recording device may record prospective patient responses to one or more of these questions. The prospective patient's consent may be obtained before this occurs. The models described herein may can process audio snippets collected from the prospective patient.

The system may be able to use standard clinical encounters to train voice biomarker models. The system may collect recordings of clinical encounters for physical complaints. The complaints may be regarding injuries, sicknesses, or chronic conditions. The system may record, with patient permission, conversation patients have with health care providers during appointments. The physical complaints may indicate patients' feelings about their health conditions. In some cases, the physical complaints may be causing patients significant distress, affecting their overall dispositions and possibly causing depression.

Voice-based biomarkers may be associated with lab values or physiological measurements. Voice-based biomarkers may be associated with mental health-related measurements. For example, they may be compared to the effects of psychiatric treatment, or logs taken by healthcare professionals such as therapists. They may be compared to answers to survey questions, to see if the voice-based analysis matches assessments commonly made in the field.

Voice-based biomarkers may be associated with physical health-related measurements. For example, vocal issues, such as illness, may contribute to a patient producing vocal sounds that need to be accounted for in order to produce actionable predictions. In addition, depression predictions over a time scale in which a patient is recovering from an illness or injury may be compared to the patient's health outcomes over that time scale, to see if treatment is improving the patient's depression or depression-related symptoms. Voice-based biomarkers may be compared with data relating to brain activity collected during multiple time points, in order to determine the clinical efficacy of the system.

Training of the models may be continuous, so that the model is continuously running while audio data is collected. Voice-based biomarkers may be continually added to the system and used for training during multiple epochs. Models may be updated using the data as it is collected.

The system may use a reinforcement learning mechanism, where survey questions may be altered dynamically in order to elicit voice-based biomarkers that yield high-confidence depression predictions. For example, the reinforcement learning mechanism may be able to select questions from a group. Based on a previous question or a sequence of previous questions, the reinforcement mechanism may choose a question that may yield a high-confidence prediction of depression.

The system may be able to determine which questions or sequences of questions may be able to yield particular elicitations from patients. The system may use machine learning to predict a particular elicitation, by producing, for example, a probability. The system may also use a softmax layer to produce probabilities for multiple elicitations. The system may use as features particular questions as well as at what times these questions are asked, how long into a survey they are asked, the time of day in which they are asked, and the point of time within a treatment course within which they are asked.

The system may include a method of using a voice-based biomarker to dynamically affect a course of treatment. The system may log elicitations of users over a period of time and determine, from the logged elicitations, whether or not treatment has been effective. For example, if voice-based biomarkers become less indicative of depression over a long time period, this might be evidence that the prescribed treatment is working. On the other hand, if the voice-based biomarkers become more indicative of depression over a long time period, the system may prompt health care providers to pursue a change in treatment, or to pursue the current course of treatment more aggressively.

The system may spontaneously recommend a change in treatment. In an embodiment where the system is continually processing and analyzing data, the system may detect a sudden increase in voice-based biomarkers indicating depression (or another mental or behavioral disorder). This may occur over a relatively short time window in a course of treatment. The system may also be able to spontaneously recommend a change if a course of treatment has been ineffective for a particular time period (e.g., six months, a year).

The system may be able to track a probability of a particular response to a medication. For example, the system may be able to track voice-based biomarkers taken before, during, and after a course of treatment, and analyze changes in scores indicative of a mental or behavioral disorder.

The system may be able to track a particular patient's probability of response to medication by having been trained on similar patients. The system may use this data to predict a patient's response based on responses of patients from similar demographics. These demographics may include age, gender, weight, height, medical history, or a combination thereof.

In addition, the system may be able to tell, based on surveying the questions, if the patient is following the treatment by analyzing his or her biomarkers. For example, a patient may become defensive, take long pauses, stammer, or act in a manner that the patient is clearly lying about having adhered to a treatment plan. The patient may also express sadness, shame, or regret regarding not having followed the treatment plan.

The system may be able to predict whether a patient will adhere to a course of treatment or medication. The system may be able to use training data from voice-based biomarkers from many patients in order to make a prediction as to whether a patient will follow a course of treatment. The system may identify particular voice-based biomarkers as predicting adherence. For example, patients with voice-based biomarkers indicating dishonesty may be designated as less likely to adhere to a treatment plan.

The system may be able to establish a baseline profile for each individual patient. An individual patient may have a particular style of speaking, with particular voice-based biomarkers indicating emotions, such as happiness, sadness, anger, and grief. For example, some people may laugh when frustrated or cry when happy. Some people may speak loudly or softly, speak clearly or mumble, have large or small vocabularies, and speak freely or more hesitantly. Some people may have extroverted personalities, while others may be more introverted.

Some people may be more hesitant to speak than others. Some people may be more guarded about expressing their feelings. Some people may have experienced trauma and abuse. Some people may be in denial about their feelings.

A person's baseline mood or mental state, and thus the person's voice-based biomarkers, may change over time. The model may be continually trained to account for this. The model may also predict depression less often. The model's predictions over time may be recorded by mental health professionals. These results may be used to show a patient's progress out of a depressive state.

The system may be able to make a particular number of profiles to account for different types of individuals. These profiles may be related to individuals' genders, ages, ethnicities, languages spoken, and occupations, for example.

Particular profiles may have similar voice-based biomarkers. For example, older people may have thinner, breathier voices than younger people. Their weaker voices may make it more difficult for microphones to pick up specific biomarkers, and they may speak more slowly than younger people. In addition, older people may stigmatize behavioral therapy, and thus, not share as much information as younger people might.

Men and women may express themselves differently, which may lead to different biomarkers. For example, men may express negative emotions more aggressively or violently, while women may be better able to articulate their emotions.

In addition, people from different cultures may have different methods of dealing with or expressing emotions or may feel guilt and shame when expressing negative emotions. It may be necessary to segment people based on their cultural backgrounds, in order to make the system more effective with respect to picking up idiosyncratic voice-based biomarkers.

The system may account for people with different personality types by segmenting and clustering by personality type. This may be done manually, as clinicians may be familiar with personality types and how people of those types may express feelings of depression. The clinicians may develop specific survey questions to elicit specific voice-based biomarkers from people from these segmented groups.

The voice-based biomarkers may be able to be used to determine whether somebody is depressed, even if the person is holding back information or attempting to outsmart testing methods. This is because many of the voice-based biomarkers may be involuntary utterances. For example, the patient may equivocate, or the patient's voice may quaver.

Particular voice-based biomarkers may correlate with particular causes of depression. For example, semantic analysis performed on many patients, in order to find specific words, phrases, or sequences thereof that indicate depression. The system may also track effects of treatment options on users, in order to determine their efficacy. Finally, the system may use reinforcement learning to determine better methods of treatment available.

Additional Use Cases

The systems disclosed herein may be used to augment care provided by healthcare providers. For example, one or more of the systems disclosed may be used to facilitate handoffs of patients to patient care providers. If the system, following an assessment, produces a score above a threshold for a particular mental state, the system may refer the patient to a specialist for further investigation and analysis. The patient may be referred before the assessment has been completed, for example, if the patient is receiving treatment in a telemedicine system or if the specialist is co-located with the patient. For example, the patient may be receiving treatment in a clinic with one or more specialists.

The system disclosed may be able to direct clinical processes for patients, following scoring. For example, if the patient were taking the assessment using a client device, the patient may, following completion of the assessment, be referred to cognitive behavioral therapy (CBT) services. They may also be referred to health care providers or have appointments with health care providers made by the system. The system disclosed may suggest one or more medications. The system may additionally suggest a specific diet or exercise regimen. The suggested exercise regimen may be based at least in part on the patient's demographics (e.g., age and gender), past medical history, or patient-generate health data (e.g., weight, cardiovascular or pulmonary health, and the like).

The systems and models described herein may be used for precision case management. In a first operation, a patient has a conversation with a case manager. In a second operation, one or more entities passively record the conversation, with consent of the patient. The conversation may be a face-to-face conversation. In another embodiment, the case manager may perform the conversation remotely. For example, the conversation may be a conversation using a telemedicine platform. In a third operation, the models described herein may process the recorded conversation and transmit real time results to a payer. The real time results may include a score corresponding to a mental state. In a fourth step, the case manager may update a care plan based on the real time results. For example, a particular score that exceeds a particular threshold may influence a future interaction between a care provider and a patient and may cause the provider to ask different questions of the patient. The score may even trigger the system to suggest particular questions associated with the score. The conversation may be repeated with the updated care plan.

The systems and models described herein may be used for primary care screening or monitoring. In a first operation, the patient visits with a primary care provider. In a second operation, speech may be captured by the primary care provider's organization for e-transcription and the system may provide a copy for analysis. In a third step, the primary care provider, from the analysis, may receive a real-time vital sign informing the care pathway. This may facilitate a warm handoff to a behavioral health specialist or may be used to direct a primary care provider on a specific care pathway.

The systems and models described herein may be used for enhanced employee assistance plan (EAP) navigation and triage. In a first operation, the patient may call the EAP line. In a second step, the system may record audiovisual data and screen the patient. The real time screening or monitoring results may be delivered to the provider in real time. The provider may be able to adaptively screen the patient about high risk topics, based on the collected real-time results. The real-time screening or monitoring data may also be provided to other entities. For example, the real-time screening or monitoring data may be provided to a clinician-on-call, used to schedule referrals, used for education purposes, or for other purposes. The interaction between the patient and EAP may be in-person or may be remote. A person staffing an EAP line may be alerted in real-time that a patient has a positive screen and may be able to help direct the patient to a proper level of therapy. An EAP may also be directed to ask questions based on a result of an assessment administered to a patient, for example, a score corresponding to a patient's mental state. Speech data as described herein may be collected and analyzed in real-time, or it may be data that is recorded and then analyzed later.

Telemedicine

Figure 19:
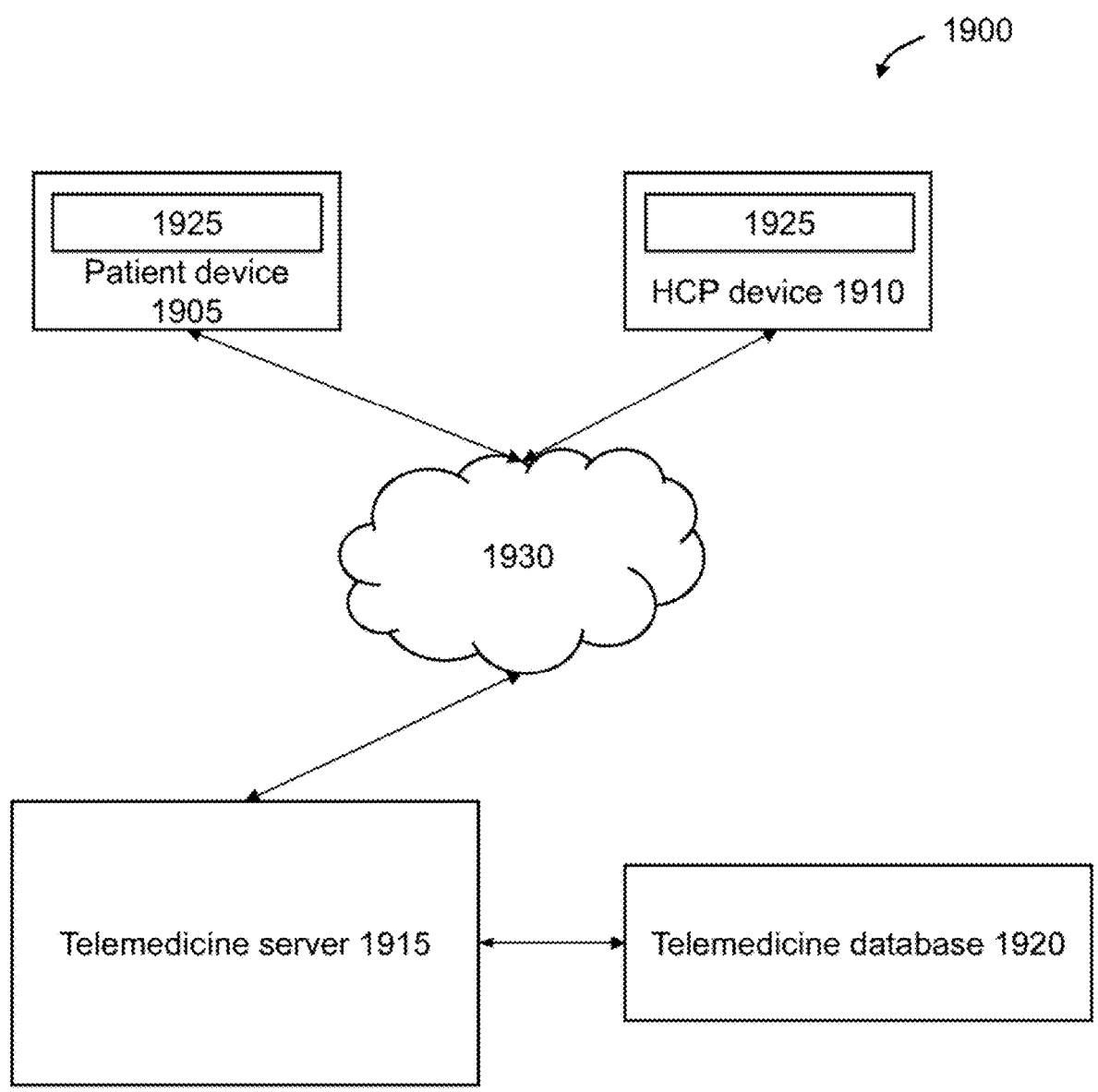
FIG. 19 schematically illustrates a telemedicine system.

In some cases, the models described herein may process audio and video from one or more telemedicine sessions between a patient and a health care provider (HCP). FIG. 19 depicts a telemedicine system 1900. The telemedicine system 1900 may enable a patient and an HCP to conduct a telemedicine session relating to the patient's health. The telemedicine system 1900 may include a patient device 1905, an HCP device 1910, a telemedicine server 1915, and a telemedicine database 1920. The patient device 1905, the HCP device 1910, and the telemedicine server 1915 can communicate over a network 1930. The patient device 1905 and the HCP device 1905 may be mobile devices (e.g., smartphones), electronic tablets, laptop or desktop computers, or the like.

The patient device 1905 and the HCP device 1910 may run instances of a telehealth application 1925. The telehealth application 1925 may be a standalone desktop application, a web application, a mobile application, or the like. Each instance of the telehealth application 1925 may have a user interface that allows the user of that instance (e.g., a patient) to establish a secure communication link with another user (e.g., a health care provider). The user interface may allow the user to record audio and video using the camera and microphone on the user's device (e.g., the patient device 1905) and consume audio and video recorded by the other user using the other user's device (e.g., the HCP device 1905). The two devices can continually exchange audio and video streams over the secure communication link, facilitating a real-time video conference between the two users. Each instance of the telehealth application 1925 may have audio and video codecs that compress and decompress the audio and video streams. In some cases, the user interface may additionally show demographic or clinical information about the patient to the HCP. Such information may be retrieved by the telemedicine server 1915 from the telemedicine database 1920.

The telemedicine system 1900 can store audio and video from a video conference in the telemedicine database 1900. Thereafter, the acoustic, NLP, and video models described herein can process the audio and video to determine, for example, whether one of the participants in the video conference (e.g., the patient) has a behavioral or mental health disorder.

Additionally or alternatively, the telemedicine system 1900 can process audio and video from the patient in real-time as the video conference is taking place. In such a case, the telemedicine database 1920 can store the acoustic, NLP, and video models described herein. The telemedicine server 1915 can obtain the audio and video streams from the patient device 1905, obtain the appropriate models from the telemedicine database 1920, and process the audio and video streams using the models to determine whether the patient has a behavioral or mental health disorder. The telemedicine server 1915 may provide the outputs of the models to the user interface of the HCP device 1905 in real-time. The outputs may be any of the outputs described herein, including qualitative or quantitative scores, confidence intervals, word clouds, or the like. The outputs may aid the HCP in guiding the video conference with the patient. The telemedicine server 1915 can additionally change the patient's user interface based on the outputs. For example, if the outputs indicate that the patient is depressed, the telemedicine server 1915 can add cognitive behavioral therapy options to the user interface.

In the case of real-time processing described above, the telemedicine server 1915 can select the appropriate models from the telemedicine database 1920 by using available demographic or clinical data about the patient. For example, the telemedicine server 1915 can select an adolescent model (e.g., a model trained primarily on audio and video from adolescents) if the patient is an adolescent. Additionally or alternatively, the telemedicine server 1915 can use image recognition processes to determine demographic information about the patient if such demographic information is not already known. For example, the telemedicine server 1915 can use image recognition processes to determine the patient's sex, age, race, or the like.

In some cases, a patient's speech may be analyzed by the models described herein immediately prior to a telemedicine session so that during the session, the health care provider can ask questions that assess the patient's predicted condition. In other cases, the patient's speech may be analyzed immediately following a telemedicine session.

In a telemedicine or face-to-face clinical encounter, it may be beneficial to match the voice characteristics of the patient to the voice characteristics of the medical provider. Doing so may improve the chances of achieving a rapport with the patient.

In some cases, the telemedicine system 1900 may connect a patient to a "care buddy." The care buddy may be assigned based at least in part on location, age, behavioral or mental condition, personality trait, or the like. Contacts between the patient and his care buddy may take place through the telemedicine system 1900. Care buddies may be provided with a template for contact, which may include week check-in calls and questions to ask each other during the calls.

Quality Control

Situations may arise in which input speech provided by a patient is not acceptable. In such cases, the systems described herein can flag the input speech in real time. In one example, a compliant user may be unable to produce speech or may produce it at suboptimal quality or quantity. An acoustic quality detector can analyze speech as it is collected and generate a warning in real-time if the quality of the speech (e.g., its volume) is too low. The system can also determine word counts in real time and can supply a new set of prompts if the word counts are not high enough. The new prompts may be designed to elicit longer or more responses. In another example, a user may try to game the system (e.g., to obtain an incentive or avoid a diagnosis). For such users, an ASR model can process the speech to determine if it is significantly different from speech from "good" users. Input from test users is then compared to this model in real time to see if the word patterns are too far from what is expected from good users. This approach can catch users who play audio from another source instead of speaking live to the system, or who talk but do not attempt to talk about the questions asked. The system can then present an alert to the user or tag the audio files.

Non-Speech Models

In some cases, the systems described herein may include non-speech models, including breathing models, laughter models, and pause models. Modeling breathing may be useful for predicting anxiety or mania. Modeling laughter (or an absence thereof) may be useful for predicting depression. Pauses may also be indicative of certain behavioral or mental health conditions. The outputs of non-speech models can be fused with the outputs of the acoustic model.

Neural Networks

The present disclosure describes various types of neural networks. Neural networks may employ multiple layers of operations to predict one or more outputs, e.g., the glucose level of a subject. Neural networks may include one or more hidden layers situated between an input layer and an output layer. The output of each layer can be used as input to another layer, e.g., the next hidden layer or the output layer. Each layer of a neural network may specify one or more transformation operations to be performed on input to the layer. Such transformation operations may be referred to as neurons. The output of a particular neuron may be a weighted sum of the inputs to the neuron, adjusted with a bias and multiplied by an activation function, e.g., a rectified linear unit (ReLU) or a sigmoid function.

Training a neural network may involve providing inputs to the untrained neural network to generate predicted outputs, comparing the predicted outputs to expected outputs, and updating the algorithm's weights and biases to account for the difference between the predicted outputs and the expected outputs. Specifically, a cost function may be used to calculate a difference between the predicted outputs and the expected outputs. By computing the derivative of the cost function with respect to the weights and biases of the network, the weights and biases may be iteratively adjusted over multiple cycles to minimize the cost function. Training may be complete when the predicted outputs satisfy a convergence condition, e.g., a small magnitude of calculated cost as determined by the cost function.

The present disclosure describes convolutional neural networks (CNNs). CNNs are neural networks in which neurons in some layers, called convolutional layers, receive input from only a small portion of the input data set (e.g., a short time segment of a speech data). These small portions may be referred to as the neurons' receptive fields. Each neuron in such a convolutional layer can have the same weights. In this way, the convolutional layer can detect certain features in any portion of the input data set. CNNs may also have pooling layers that combine the outputs of neuron clusters in convolutional layers and fully-connected layers that are similar to traditional layers in a feed-forward neural network.

The present disclosure describes recurrent neural networks (RNNs). RNNs are neural networks with cyclical connections that can encode dependencies in time-series data, e.g., speech data. An RNN may include an input layer that is configured to receive a sequence of time-series inputs. An RNN may also include one or more hidden recurrent layers that maintain a state. At each time step, each hidden recurrent layer can compute an output and a next state for the layer. The next state can depend on the previous state and the current input. The state can be maintained across time steps and can capture dependencies in the input sequence.

One example of an RNN is an LSTM, which may be made of LSTM units. An LSTM unit can be made of a cell, an input gate, an output gate, and a forget gate. The cell can be responsible for keeping track of the dependencies between the elements in the input sequence. The input gate can control the extent to which a new value flows into the cell, the forget gate can control the extent to which a value remains in the cell, and the output gate can control the extent to which the value in the cell is used to compute the output activation of the LSTM unit. The activation function of the LSTM gate can be the logistic function. LSTMs may be bidirectional.

Computer Systems

Figure 8:
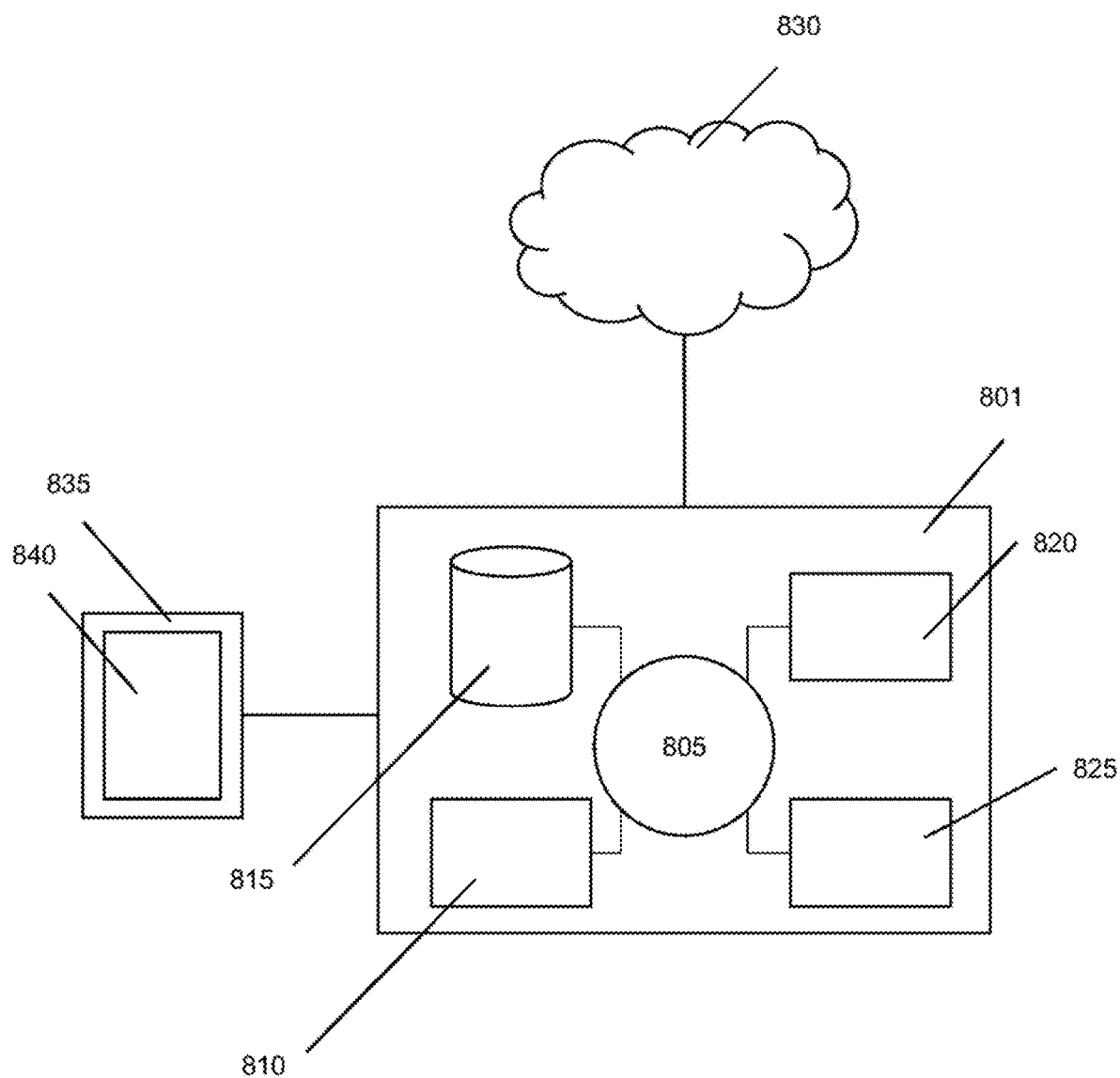
FIG. 8 shows a computer system that is programmed or otherwise configured to implement methods provided herein.

The present disclosure provides computer systems that are programmed to implement methods of the disclosure. FIG. 8 shows a computer system 801 that is programmed or otherwise configured to implement the system 100 of FIG. 1 or perform the training processes of FIG. 4 and FIG. 5.

The computer system 801 includes a central processing unit (CPU, also "processor" and "computer processor" herein) 805, which may be a single core or multi core processor, or a plurality of processors for parallel processing. The computer system 801 also includes memory or memory location 810 (e.g., random-access memory, read-only memory, flash memory), electronic storage unit 815 (e.g., hard disk), communication interface 820 (e.g., network adapter) for communicating with one or more other systems, and peripheral devices 825, such as cache, other memory, data storage and/or electronic display adapters. The memory 810, storage unit 815, interface 820 and peripheral devices 825 are in communication with the CPU 805 through a communication bus (solid lines), such as a motherboard. The storage unit 815 may be a data storage unit (or data repository) for storing data. The computer system 801 can be operatively coupled to a computer network ("network") 830 with the aid of the communication interface 820. The network 830 may be the Internet, an internet and/or extranet, or an intranet and/or extranet that is in communication with the Internet. The network 830 in some cases is a telecommunication and/or data network. The network 830 may include one or more computer servers, which can enable distributed computing, such as cloud computing. The network 830, in some cases with the aid of the computer system 801, can implement a peer-to-peer network, which may enable devices coupled to the computer system 801 to behave as a client or a server.

The CPU 805 can execute a sequence of machine-readable instructions, which may be embodied in a program or software. The instructions may be stored in a memory location, such as the memory 810. The instructions can be directed to the CPU 805, which can subsequently program or otherwise configure the CPU 805 to implement methods of the present disclosure. Examples of operations performed by the CPU 805 may include fetch, decode, execute, and writeback.

The CPU 805 may be part of a circuit, such as an integrated circuit. One or more other components of the system 801 may be included in the circuit. In some cases, the circuit is an application specific integrated circuit (ASIC).

The storage unit 815 can store files, such as drivers, libraries and saved programs. The storage unit 815 can store user data, e.g., user preferences and user programs. The computer system 801 in some cases may include one or more additional data storage units that are external to the computer system 801, such as located on a remote server that is in communication with the computer system 801 through an intranet or the Internet.

The computer system 801 can communicate with one or more remote computer systems through the network 830. For instance, the computer system 801 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 801 via the network 830.

Methods as described herein may be implemented by way of machine (e.g., computer processor) executable code stored on an electronic storage location of the computer system 801, such as, for example, on the memory 810 or electronic storage unit 815. The machine executable or machine-readable code may be provided in the form of software. During use, the code can be executed by the processor 805. In some cases, the code can be retrieved from the storage unit 815 and stored on the memory 810 for ready access by the processor 805. In some situations, the electronic storage unit 815 can be precluded, and machine-executable instructions are stored on memory 810.

The code can be pre-compiled and configured for use with a machine having a processer adapted to execute the code, or can be compiled during runtime. The code can be supplied in a programming language that may be selected to enable the code to execute in a pre-compiled or as-compiled fashion.

Aspects of the systems and methods provided herein, such as the computer system 801, may be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media may include any or all of the tangible memory of the computers, processors or the like, or associated modules thereof, such as various semi-conductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, Blu-ray, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 801 may include or be in communication with an electronic display 835 that comprises a user interface (UI) 840 for providing, for example, one or more queries to a user that may elicit speech from the user. Examples of UI's include, without limitation, a graphical user interface (GUI) and web-based user interface.

Methods and systems of the present disclosure may be implemented by way of one or more algorithms. An algorithm may be implemented by way of software upon execution by the central processing unit 805. The algorithm may, for example, be any of the acoustic models, machine learning models, or training processes described herein.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for detecting a behavioral or mental health condition in a subject, said method comprising:
    (a) obtaining a speech sample comprising one or more speech segments from said subject;
    (b) extracting, from said speech sample, one or more spectro-temporal signal representations;
    (c) processing said speech sample with a stochastic natural language processing (NLP) model to generate an embedding of said speech sample; and
    (d) using said embedding to generate an output indicative of whether said subject has said behavioral or mental health condition, wherein generating the output indicative of whether said subject has said behavioral or mental health condition further comprises generating an output indicative of whether said subject has an additional behavioral or mental health condition based on whether said subject has said behavioral or mental health condition using an additional embedding,
    wherein said stochastic NLP model comprises (1) a (i) binary classifier or (ii) multi-class classifier, and wherein said output from (i) is a binary output that indicates whether said subject has or does not have said behavioral or mental health condition, and said output from (ii) comprises a probability distribution over a plurality of levels or severities of said behavioral or mental health condition in said subject, and (2) a regression model that outputs an estimate of condition severity of said behavioral or mental health condition in said subject.

2. The method of claim 1, wherein said output comprises a segment output for each segment of said speech sample from said subject, and wherein said method further comprises utilizing two or more contiguous or non-contiguous segment outputs to detect said behavioral or mental health condition in said subject.

3. The method of claim 1, wherein said stochastic NLP model is pretrained to perform a first task other than detecting said behavioral or mental health condition and said additional behavioral or mental health condition in said subject, and wherein said first task comprises automatic speech recognition, speaker recognition, emotion classification, sound classification, or one or more classification tasks that takes audio as input.

4. The method of claim 1, further comprising: augmenting said stochastic NLP model, using nonword information comprising laughter, breathing, pausing, mouth noises, sighs, or vocal but nonword events.

5. The method of claim 1, further comprising determining whether said speech sample meets one or more pre-set quality thresholds, wherein a quality relates to at least one of quality of said speech sample, quality of signals recorded, or length of said speech sample.

6. The method of claim 1, further comprising transcribing said speech sample to generate a transcribed speech sample and generating embeddings of said speech sample.

7. The method of claim 1, wherein said stochastic NLP model comprises a long short-term memory (LSTM) architecture, any variant of a transformer or attention-based architecture, or a shallow or deep learning architecture that takes in precomputed word-based features.

8. The method of claim 1, wherein (a) comprises obtaining said speech sample during a telehealth session or a digital health session, from one or more devices that are capable of or configured to generate a speech recording, and/or from speech communications between said subject and one or more other personnel or digital entity.

9. The method of claim 1, wherein (b) and (c) are performed at least in part on a mobile device and/or a remote server.

10. The method of claim 1, further comprising: post-processing said outputs of said stochastic NLP model to produce normalized scores and/or scaled scores, and to generate confidence measures for said normalized or scaled scores.

11. The method of claim 10, further comprising: using said confidence measures to predict whether said subject has said behavioral or mental health condition.

12. The method of claim 1, further comprising: training a plurality of models within a model type; and dynamically selecting one or more models from said plurality of trained models at run-time based at least on pre-defined content.

13. The method of claim 12, further comprising: selecting a particular model or combination of models from said trained models depending at least on an input, wherein said input comprises a prompt used, a speaker's characteristics or metadata, a length of said input, or properties of said input.

14. The method of claim 1, wherein said behavioral or mental health condition is an associated comorbidity with said additional behavioral or mental health condition.

15. The method of claim 1, wherein said output comprises a severity or level of said behavioral or mental health condition in said subject.

16. The method of claim 1, wherein using said embedding comprises fusing said embedding and at least one more model output.

17. The method of claim 1, wherein said stochastic NLP model is joint with another model type.

\* \* \* \* \*